United States Patent [19]

Prunotto et al.

[11] Patent Number: 5,287,433
[45] Date of Patent: Feb. 15, 1994

[54] DEVICE FOR CONTROL OF A ROBOT MANIPULATOR FOR A METAL SHEET BENDING INSTALLATION

[75] Inventors: Gianpaolo Prunotto; Marco Prada, both of Turin, Italy

[73] Assignee: Amada Company Limited, Kanagawa, Japan

[21] Appl. No.: 741,436

[22] PCT Filed: Dec. 18, 1990

[86] PCT No.: PCT/JP90/01648

§ 371 Date: Aug. 7, 1991

§ 102(e) Date: Aug. 7, 1991

[87] PCT Pub. No.: WO91/08869

PCT Pub. Date: Jun. 27, 1991

[30] Foreign Application Priority Data

Dec. 18, 1989 [IT] Italy ............................. 68115 A/89
Dec. 18, 1989 [IT] Italy ............................. 68116 A/89
Dec. 18, 1989 [IT] Italy ............................. 68117 A/89

[51] Int. Cl.[5] .................... B25J 9/16; G05B 19/405
[52] U.S. Cl. ................................ 395/99; 395/82; 72/422; 364/474.07; 364/474.22; 364/188; 364/472; 901/3
[58] Field of Search .......................... 395/99, 82

[56] References Cited

U.S. PATENT DOCUMENTS

| | | | |
|---|---|---|---|
| 3,920,972 | 11/1975 | Corwin, Jr. et al. | 235/151.11 |
| 4,379,335 | 4/1983 | Kirsch et al. | 364/513 |
| 4,484,120 | 11/1984 | Olex et al. | 318/568 |
| 4,517,652 | 5/1985 | Bennett et al. | 364/513 |
| 4,543,639 | 9/1985 | Inaba et al. | 364/513 |
| 4,757,459 | 7/1988 | Lauchnor et al. | 364/513 |
| 4,815,011 | 3/1989 | Mizuno et al. | 364/513 |
| 4,888,708 | 12/1989 | Brantmark et al. | 364/513 |
| 4,998,206 | 3/1991 | Jones et al. | 364/468 |
| 5,005,394 | 4/1991 | Sartorio et al. | 72/10 |

FOREIGN PATENT DOCUMENTS

| | | | |
|---|---|---|---|
| 3322220 | 1/1984 | Fed. Rep. of Germany | B25J 9/00 |
| 67224 A/88 | 3/1988 | Italy . | |
| 59-014301 | 8/1985 | Japan | G05B 19/42 |
| 2120203 | 11/1983 | United Kingdom | B25J 9/00 |
| 2217002 | 6/1989 | United Kingdom | G05B 19/405 |
| 2217244 | 10/1989 | United Kingdom | B21D 43/00 |

OTHER PUBLICATIONS

Copy of International Search Report and Annex, Mar. 12, 1991.
English Language Translation of Italian Patent Application No. 67224-A/88, 1988.

*Primary Examiner*—Michael R. Fleming
*Assistant Examiner*—Robert W. Downs
*Attorney, Agent, or Firm*—Sandler, Greenblum & Bernstein

[57] ABSTRACT

To perform a simple and rapid preparation of control program, the control device for a robot manipulator for a sheet metal bending installation is provided with a first key for inputting a command signal for actuating a first actuator that is adapted to move a movable element of the metal sheet bending installation through a constant distance or amount, and a second key for inputting a command signal for actuating a second actuator that is adapted to move another movable element of the metal sheet bending installation through a changeable distance or amount. Further, to increase the working speed of the sequence of control signals for the metal sheet bending installation, the control device is provided with a device for detecting a plurality of command signals for subsequently actuating a plurality of actuator and for subsequently moving an element or elements of the installation, and a device for associating the the plurality of command signals to produce an associated single command signal for actuating subsequently the plurality of the second actuator without any stops between the actions thereof.

6 Claims, 24 Drawing Sheets

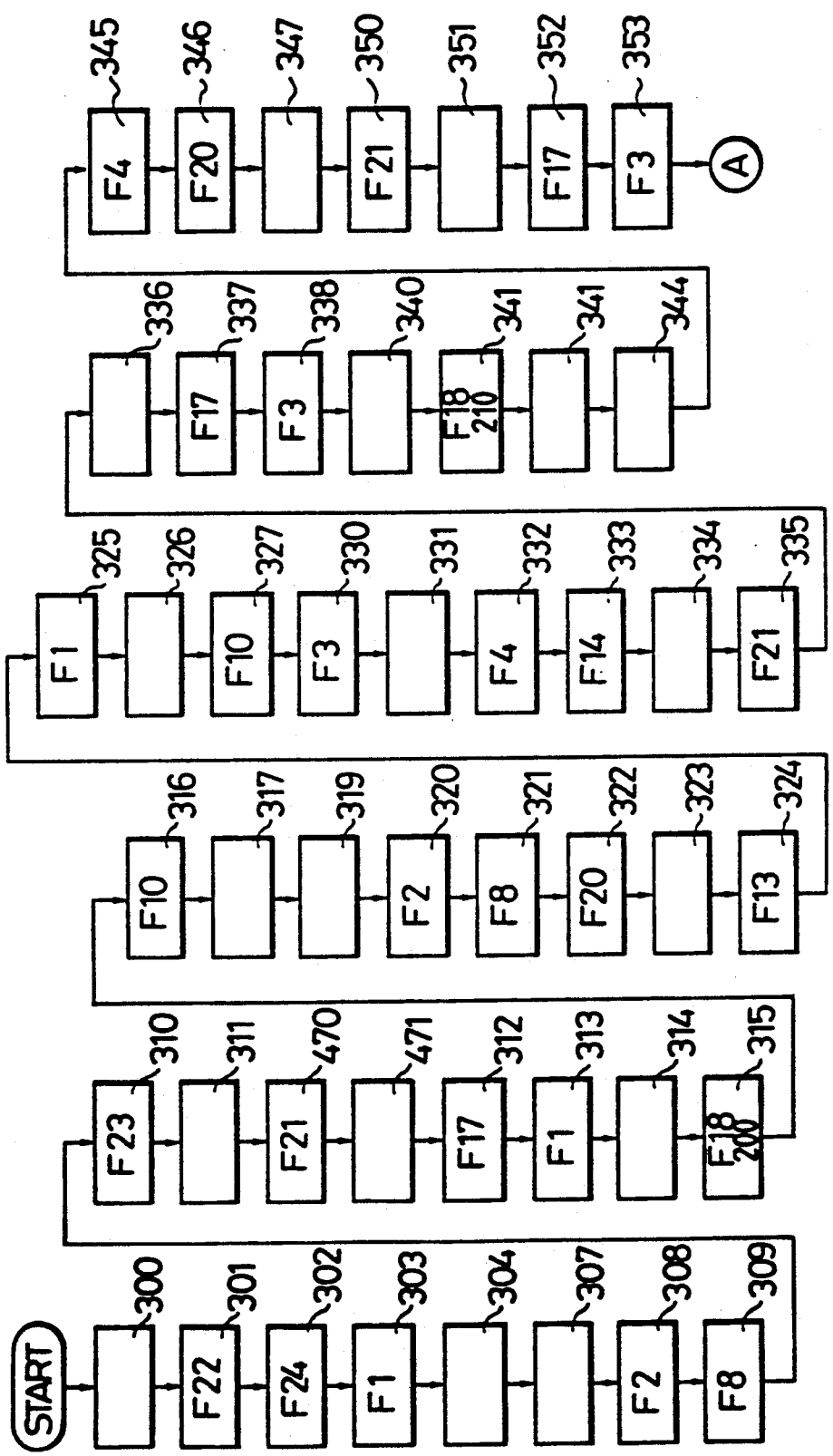

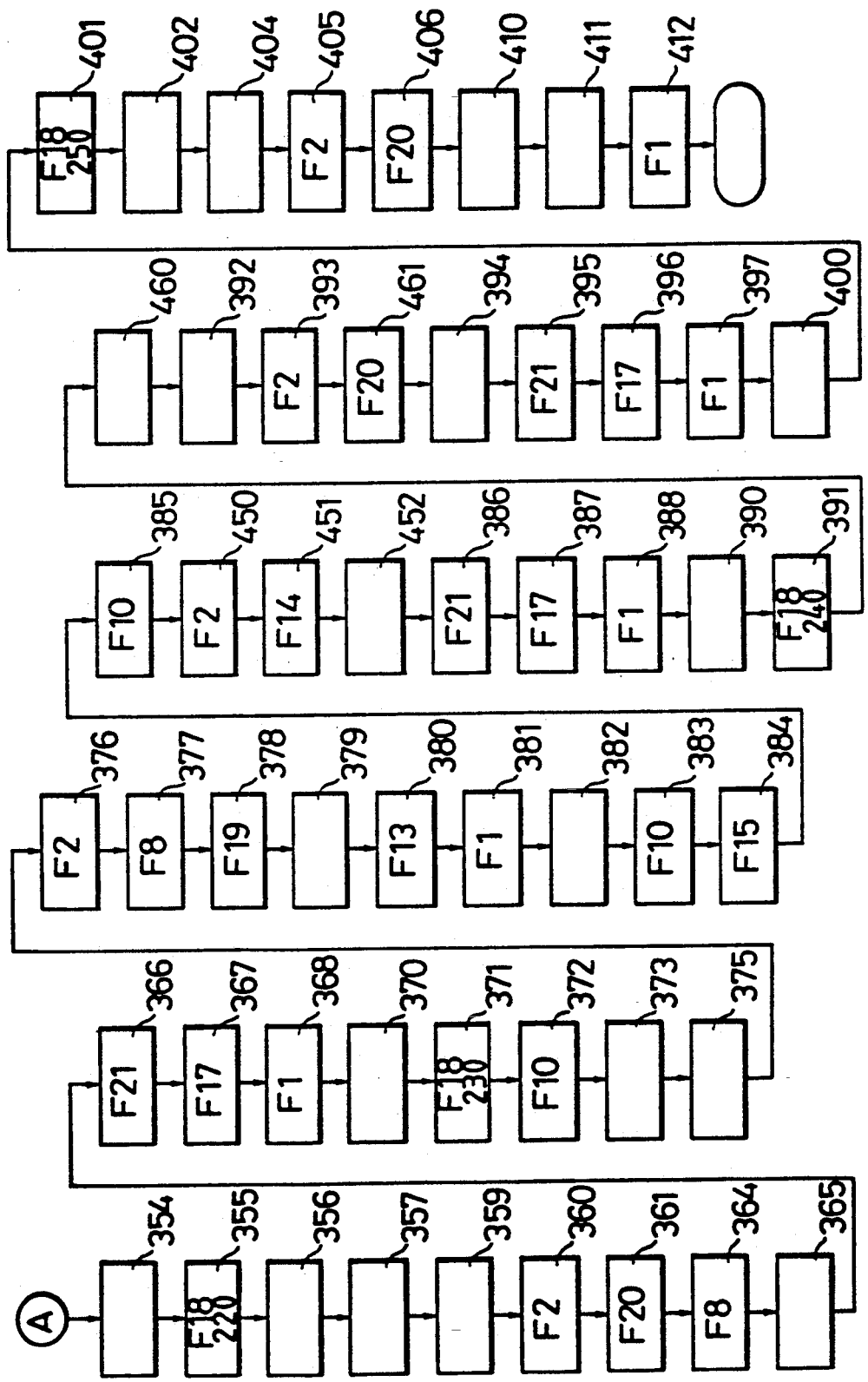

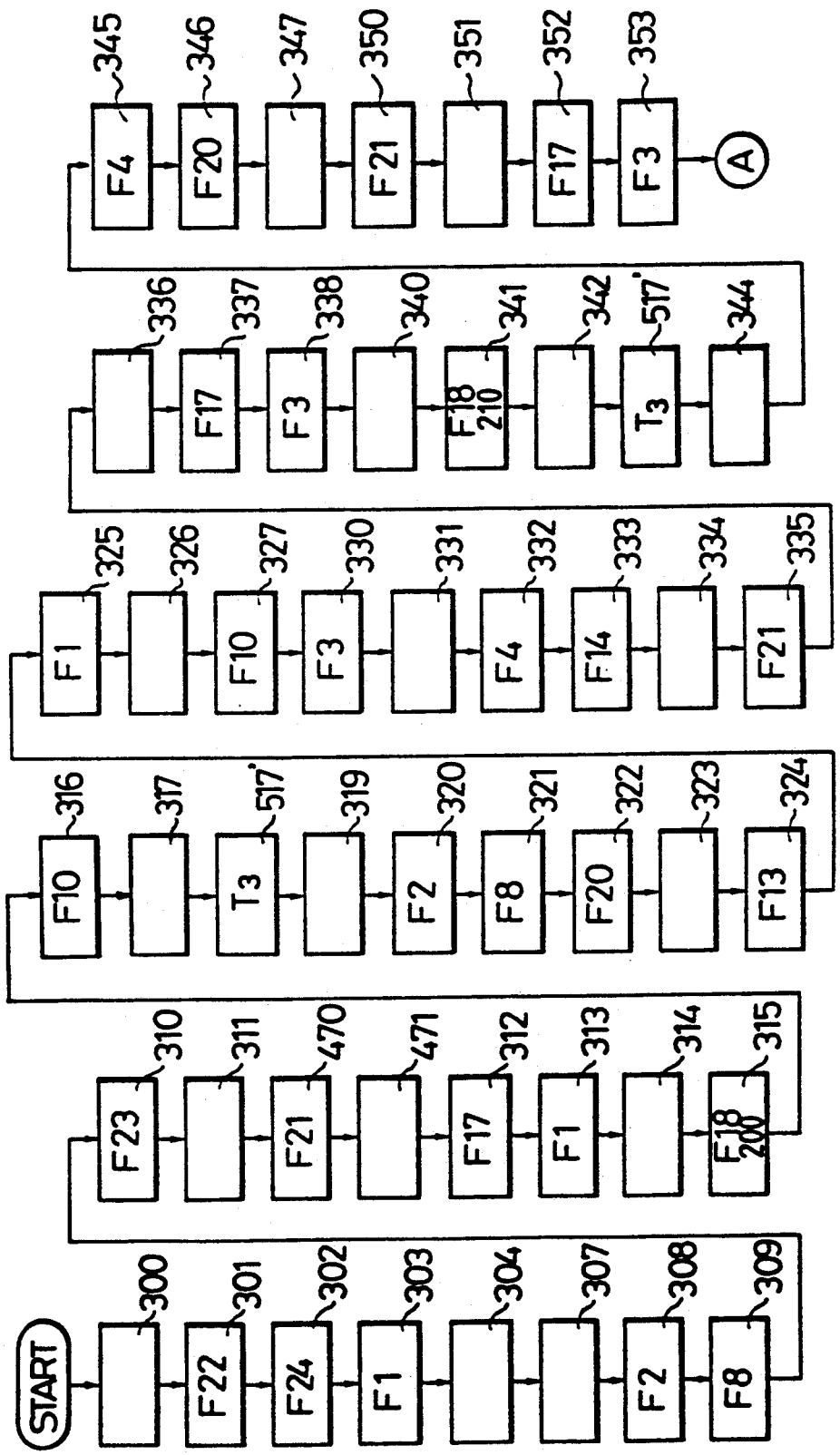

FIG.16a
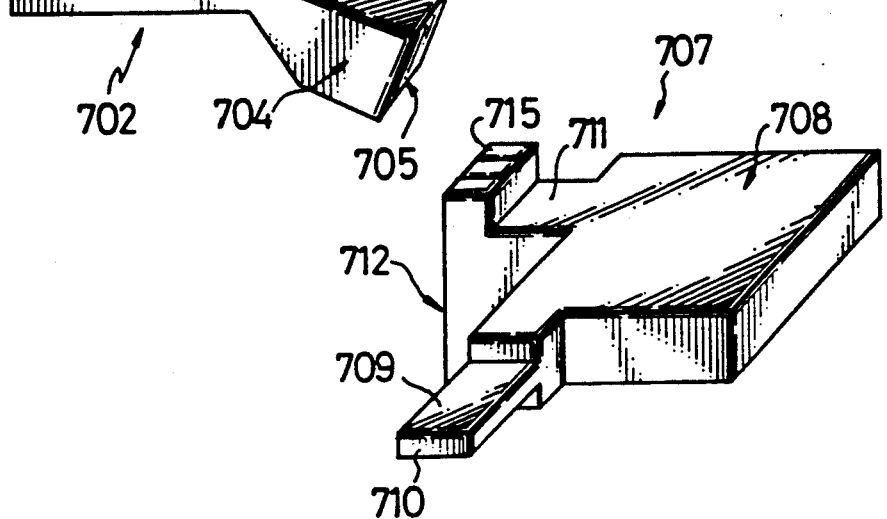
FIG.16b
FIG.17
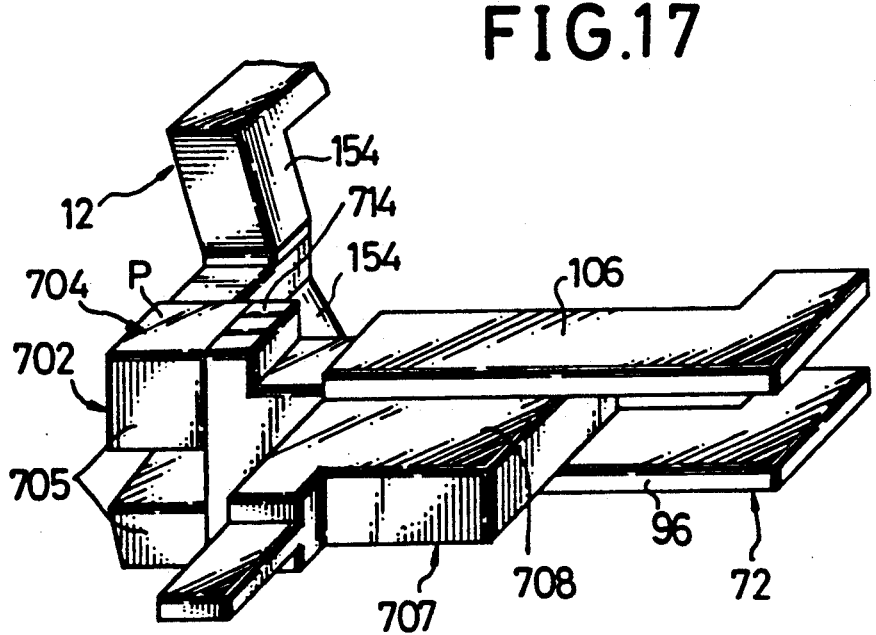

DEVICE FOR CONTROL OF A ROBOT MANIPULATOR FOR A METAL SHEET BENDING INSTALLATION

BACKGROUND OF THE INVENTION

1. Field of the Invention

The present invention relates to a device for control of a robot manipulator for a metal sheet bending installation.

2. Description of the Prior Art

The present invention is advantageously applied to the command and control of a robot manipulator of the type described in Italian Patent application filed Mar. 15, 1988 under application No 67224-A/88 by the same applicant. This manipulator device comprises a pair of motor driven manipulator heads which translate within a manipulation space and are rotatable about a common axis which is parallel to a linear bending zone defined by the dies of a press. The manipulator heads are adapted to grip the opposite edges of a metal sheet and to position this metal sheet between the dies of the press in such a way as to allow a predetermined bending of the metal sheet. This manipulator device further has an arm with a plurality of auxiliary pincers which can grip an edge of the metal sheet to invert it. The manipulator device and the press are controlled by an electronic command and control unit which, on the basis of previously memorised instructions, imparts thereto sequential instructions defining successive bending cycles.

The instructions for the various working phases are normally imparted to the command unit by the so-called "self-learning" procedure on the basis of which an operator physically moves the machine in a sequential manner through the movements which the bending cycle requires, and when each individual movement has been effected inserts into the command unit the parameters relating to this movement.

In this way the various positions assumed by the elements of the machine (for example the successive positions assumed by the manipulator heads) are memorised in a sequential manner within the RAM memory of the command and control unit, and can subsequently be read by this command unit and therefore performed again during the operating bending cycles.

It is clear from what has been explained above that when it is desired to modify a previously memorised bending cycle it is necessary to perform a new self-learning procedure which takes up considerable time to complete and is rather onerous.

Moreover, the staff employed to perform the self-learning procedure must know the machine and the admissible sequence of operating steps very well, and must position the various elements thereof with extreme precision, so as to insert reliable data into the control unit.

SUMMARY OF THE INVENTION

Thus, a first object of the present invention is to provide a device for control of a robot manipulator for the sheet metal bending installation, which apparatus effects automatic creation of command signals for controlling the phases of the working cycle of a robot manipulator for a sheet metal bending installation, and which allows a simpler and more rapid definition of the cycle of operations to be achieved.

The first object of the present invention is achieved by the provision of a control device characterised by the fact that it comprises means selectable by an operator and operable to create a complete sequence of the said command signals for controlling the said phases.

A second object of the present invention is to provide a control apparatus for increasing the working speed of the sequence of control signals for a metal sheet bending installation so as to reduce the time taken to perform the working cycle with respect to that defined as a result of programming, with a guarantee of the correct and complete execution of the various operating phases of the bending cycle.

The second object of the present invention is achieved by the provision of a control device that is characterised by the fact that it includes means for detecting at least a predetermined one of the command and control signals, and for associating another command and control signal to the predetermined signal.

Further, in the control device of the prior art, in order to reduce the time taken to create the instructions for the various phases of a bending cycle, the instructions are defined either in a specimen installation or in an external unit outside the central electronic command and control unit of the installation, and only then memorised in the central unit of the operating installation for execution. This however presents a series of difficulties in that a bending installation is composed of a plurality of separate component parts (a press, a magazine for the metal sheets, a support for the auxiliary pincers etc) which are not connected together stably, and which must be mounted to the floor of the space in which the bending installation is housed, in such a way that the various parts of the installation are spaced from one another, and are disposed in such a way as to achieve a well defined dimensional configuration.

Inasmuch as the sequences of command signals for the various movements of the parts of the installation during the bending phases would have been previously defined for a given specimen disposition of the said parts, it is evident that, if the various parts of the bending installation are assembled in a manner even slightly different from that of the specimen configuration the bending installation will not function in a correct manner when acting on the previously defined instructions.

Thus, A third object of the present invention is to provide a control device for checking the dimensions of the configuration of a metal sheet bending installation, and for automatic adaptation of command and control signals for the various movements of the parts of the installation, which allows a sequence of such signals previously defined in a specimen configuration of the installation to be utilised in a manner which overcomes the above-indicated disadvantages, and allows a reduction in the operating times of the installation.

The third object is achieved by the present invention which relates to a control device for checking the dimensions of the configuration of a robot manipulator device of a metal sheet bending installation, and for automatic adaptation of the command and control signals for the said robot manipulator device, characterised by the fact that it comprises a first stage in which a first sequence of the said command and control signals is defined for a specimen configuration of the said installation, a second stage in which corresponding dimensional values of the said specimen configuration and of the said configuration of the said installation are compared, and a third stage in which the said first sequence of command and control signals is automatically adapted to obtain a second sequence of signals suitable for the said assembled configuration of said installation.

BRIEF DESCRIPTION OF THE DRAWING

For a better understanding of the present invention a non-limitative description of an embodiment thereof is now given, with reference to the attached drawings, in which:

FIGS. 10a and 10b comprise a flow chart of the phases of the operating cycle created to produce the profile illustrated in FIG. 7;

FIGS. 15a and 15b are flow charts illustrating the phases of the operating cycle for producing the profile illustrated in FIG. 7, as obtained according to the system of the present invention.

FIGS. 16a and 16b are perspective views of a first and a second metal block utilised as equipment in the dimension checking system of the present invention for the bending installation illustrated in FIG. 1;

FIG. 17 is a perspective view of a pair of the blocks of FIGS. 16a and 16b, utilised by a manipulator head and by an auxiliary pincer of the installation of FIG. 1 (partially represented) in a first dimension checking stage according to the system of the present invention;

FIG. 19a is a side view of a block of FIG. 16b utilised by a manipulator head (partially shown) of the installation of FIG. 1 in a third dimension checking-stage according to the system of the present invention, shown against a workpiece discharge table;

FIG. 19b is a partial view on an enlarged scale of a portion of FIG. 19a;

DETAILED DESCRIPTION OF THE PREFERRED EMBODIMENTS

Figure 1:
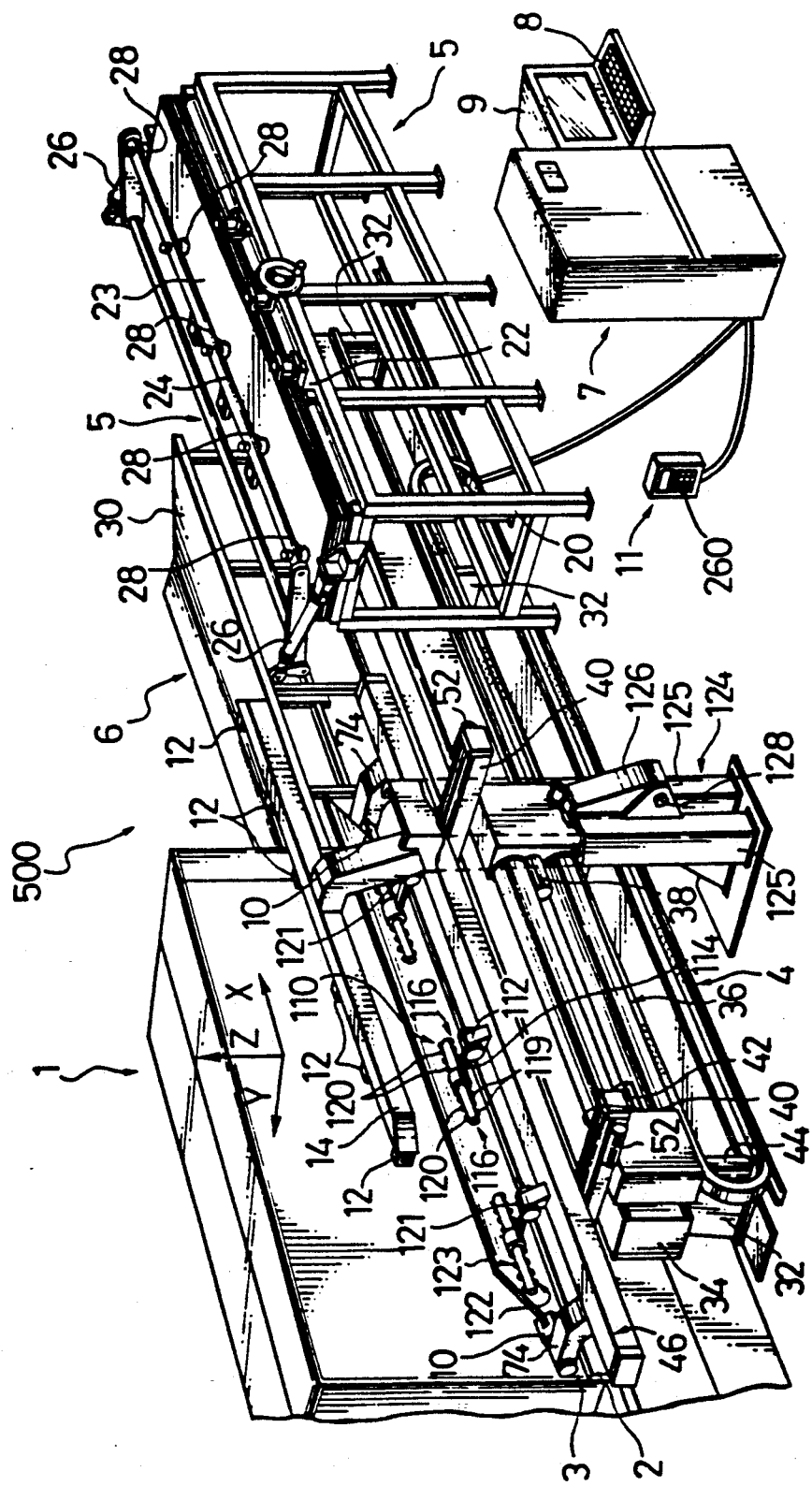
FIG. 1 is a perspective view of a sheet metal bending installation comprising a bending press, a manipulator device, a loading device and a workpiece unloading table, controlled by an electronic command and control unit using the speed increasing system which is the subject of the present invention.

A first embodiment of the present invention will now be described as applied to a sequence of command and control signals for a robot manipulator device of a sheet metal bending press the structure of which is represented in FIGS. 1 to 6; in particular, FIG. 1 illustrates a sheet metal bending installation 500, and the reference numeral 1 generally indicates a bending press including a die 2 and a die 3. In front of the press 1 there is a manipulator device 4.

On one side of the press 1 there is located a magazine with a loader device 5 and a discharge table generally indicated 6.

An electronic microprocessor controlled unit 7 controls the operation of the manipulator device 4 and the press 1. The electronic unit 7 is provided with an alphanumeric keyboard 8, a video 9, and a small portable keyboard 11 (hand box) utilised in a manner which will be clarified hereinbelow.

The loader device 5 comprises a bed 20 with an upper plane 22 on which rests a stack of flat, rectangular metal sheets 23 to be subjected to bending.

A movable beam 24, controlled by actuators 26, carries a series of suckers 28 for lifting the sheets 23 in succession and transferring them to a horizontal position in the space between the loader device 5 and the discharge table 6, which latter is constituted by a simple bed with an inclined support plane 30. The plane 30 is intended, as will be seen, to receive the shaped sheets from the manipulator device 4.

This manipulator device 4 includes a support base having feet 32 which carry a guide 34. The guide 34 extends parallel to the, working plane of the press 1 along the whole of the lower part of the press 1, and into the space between the loader device 5 and the discharge table 6.

On the guide 34 there slides an elongate carriage generally indicated 36, which is slidable parallel to the die 2, that is to say along the X-axis. The carriage 36 is movable along the guide 34 from a position in which it faces the press 1 to a position in which it is located between the loading device 5 and the discharge table 6.

These movements of the carriage 36 along the guide 34 are controlled by a servo motor 38 which is preferably numerically controlled. The servo motor 38 drives a toothed wheel (not shown) which cooperates with a rack (not shown) which extends along the guide 34.

The carriage 36 supports, adjacent its ends, a pair of longitudinal guides 40 which extend parallel to the Y-axis. Each of these guides 40 is vertically slidable on the carriage 36 parallel to the Z-axis. Their movement along the Z-axis is controlled by a numerically controlled servo motor 42 carried by the carriage 36. Each guide 40 is supported by a vertical rod 44 slidable in the carriage 36. The servo motor 42 drives in unison respective toothed wheels (not shown) meshing with respective racks (not shown) supported by the rods 44.

The guides 40 support a robust beam 46 which extends parallel to the bending zone defined by the dies 2 and 3.

The beam 46 is supported on the guides 40 by respective slides 48 movable parallel to the Y-axis.

Each slide 48 carries a vertical pin 50 about which the beam 46 can oscillate horizontally through a small angle.

The movements of each slide 48 are controlled by a respective, numerically controlled servo motor 52 carried by the respective guide 40. Each servo motor 52 drives a respective worm screw (not shown) which extends within the guide 40 and which cooperates with a nut (not shown) fixed to the respective slide 48.

The movements of the beam 46 along the Y-axis, during manipulation of the workpieces, are controlled by the two servo motors 52 acting in unison in such a way that the beam 46 moves parallel to itself.

In order to effect a precise positioning of the sheet 23, the press 1 is provided with a pair of alignment sensors 66 which are mounted on supports slidable along the Y-axis, and which are disposed close to the die 3. The sensors 66 are provided with a rod 67 which is movable parallel to the Y-axis and terminates with an end 68 adapted to detect contact with an edge of the metal sheet 23.

The side of the beam 46 facing the press 1 carries two motor driven slides (not shown) slidable in unison and in opposite directions along the beam 46 itself; each slide carries a robust hollow projecting arm 74 extending towards the bending press 1. Each of these arms 74 carries at its free ends a respective manipulator head 10 the axis of rotation of which is common to the two heads.

As will be understood, the movements of the two slides serve to cause engagement of the manipulator heads 10 with the edges of the sheet 23 and their disengagement therefrom.

The rotations, in unison, of the two heads 10 about their axes, both for changing the attitude and the position of the manipulator pincers carried by the heads 10, are controlled by a numerically controlled servo motor.

Figure 3:
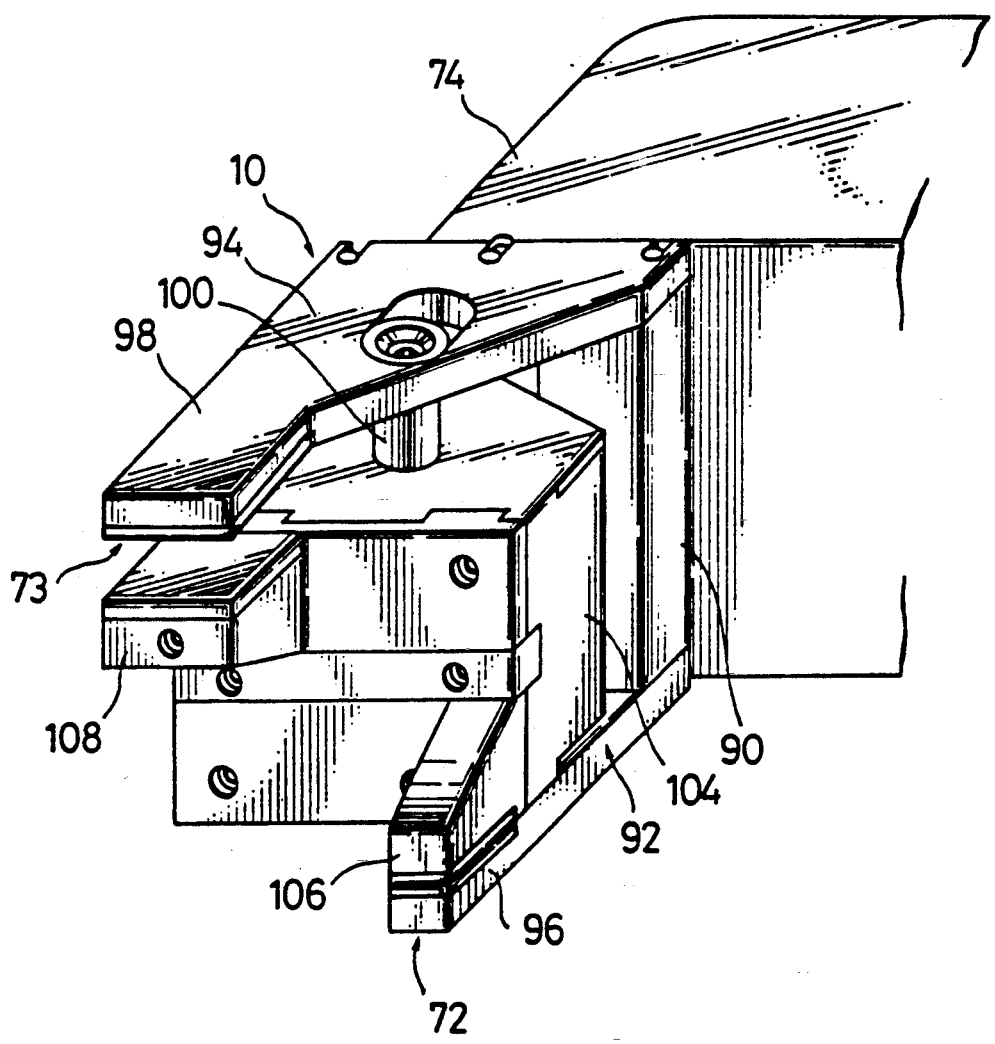
FIG. 3 is a perspective view of a manipulator head of the manipulator device illustrated in FIG. 1.

Referring now to FIG. 3, the preferred structure of the two manipulator heads 10 will be described.

The head 10 comprises a square flange 90 which supports two projecting opposite cheeks 92 and 94. The free ends of these cheeks 92 and 94 are shaped in such a way as to constitute respective outer fixed jaws 96 and 98, of a manipulator pincer 72 and a manipulator pincer 73 respectively.

Centrally between the two cheeks 92 and 94 extends a rod 100 to which is fixed a double piston. The piston is surrounded by a movable body 104 constituting a cylinder for the piston. The body 104 is movable to and fro along the rod 100.

To the body 104 are fixed two movable jaws 106 and 108 one of which forms part of the manipulator pincer 72 and the other of which forms part of the manipulator pincer 73.

As can be seen, the disposition is such that when the pincer 73 is open the pincer 72 is closed and vice versa.

As can also be seen, the two diametrically opposite manipulator pincers 72 and 73 are situated eccentrically with respect to the axis of rotation of the head 10. The fixed jaws 96 and 98 are situated on the outline of the head, whilst the movable jaws 106 and 108 are slidable within the outline of the head 10. This disposition is the most favourable for achieving a manipulator head 10 of very small dimensions and permits the maximum possible approach of the manipulator pincers 72 and 73 to the bending zone.

Both the fixed jaws 96 and 98 and the movable jaws 106 and 108 are replaceable in a simple and rapid manner with jaws of different dimensions, especially in width. Whilst the jaws 908 and 108 shown may be of minimum width, the maximum width of the jaws can be equal to the width of the head.

Figure 4:
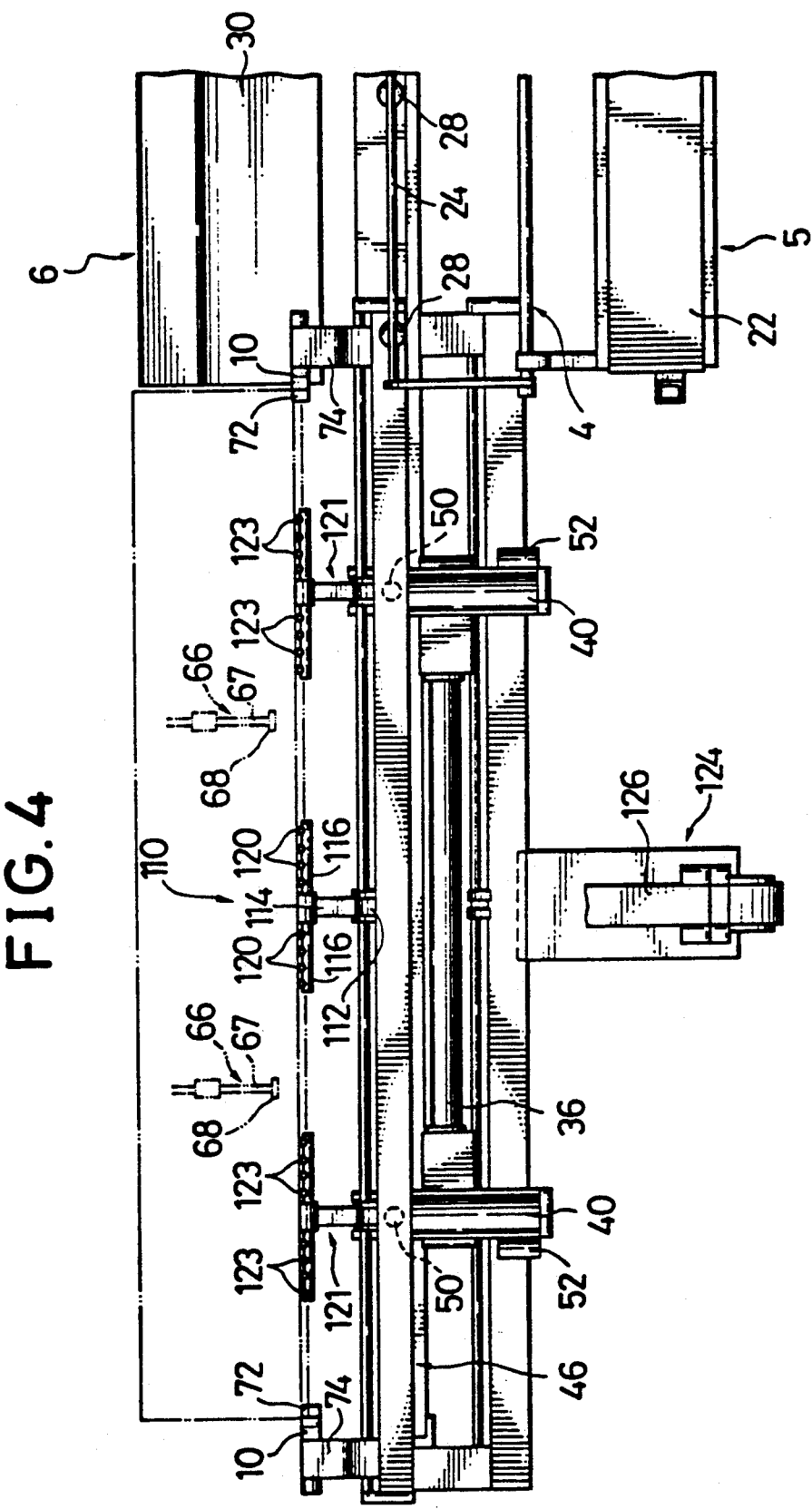
FIG. 4 is a plan view from above of the manipulator device.

Referring now to FIGS. 1 and 4, an auxiliary support for the manipulation of very long sheet metal workpieces, with which the manipulator device 4 is provided, will now be described.

When a sheet of this type is supported at its ends by the pincers of the manipulator head 10 before bending, or when only small bends have been formed, it is susceptible of sagging and it is therefore necessary to support it in at least one intermediate zone.

For this purpose, along the beam 46 there is mounted at least one principal auxiliary support device generally indicated 110. This device 110 comprises a carriage 112 which is manually movable along the beam 46 and lockable on this in a desired position. If only one auxiliary device 110 is provided this position is the median position illustrated in FIG. 1.

A hollow projecting auxiliary support arm 114 is articulated on the carriage 112 about a horizontal axis parallel to the X-direction. When the device 110 is in operation an actuator (not shown) carried by the carriage 112 maintains the arm 14 in a raised position. At its free end the arm 114 carries an auxiliary support head 116 having two suction tubes.

The head 116 is rotatable about an axis which coincides with the axis of rotation of the manipulator heads 10 and the auxiliary head 116 turns in unison with the manipulator heads 10.

The head 116 carries two series of diagonally opposite lower suckers 119 and upper suckers 120 like the manipulator pincers 72 and 73 and having abutment surfaces which correspond with the gripping planes of the manipulator heads 10. The suckers 120 are connected, in a manner not shown, to a vacuum source (not shown).

As will be understood, the suckers 119 or 120 are able to support a sheet at its intermediate zone independently of the attitude of the surface of the sheet which they engage.

In the case of a sheet of great width the auxiliary support device 110 is utilised when forming the first bends.

When the auxiliary support is not needed the actuator is controlled in such a way as to cause the arm 114 to descend to an inactive position.

The auxiliary support 110 is flanked by two secondary support devices 121 which are disposed on opposite sides of the device 110 and have a similar structure. The devices 121, among other things have a plurality of upper suckers 123 and lower suckers 122 the function of which is analogous to that of the suckers 119 and 120.

Figure 2:
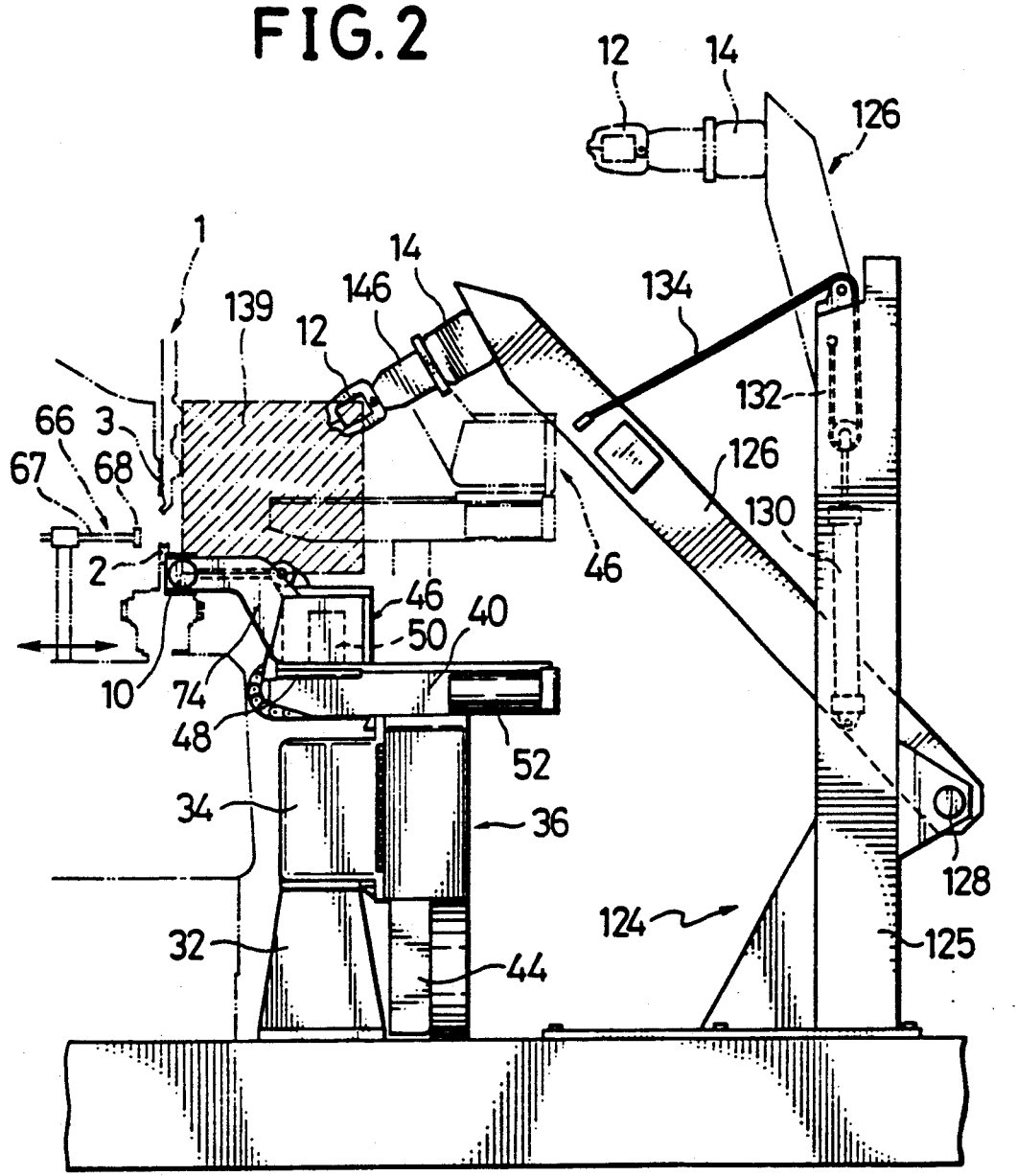
FIG. 2 is a side elevation view of the manipulator device illustrated in FIG. 1, with some parts represented in different positions.
Figure 6:
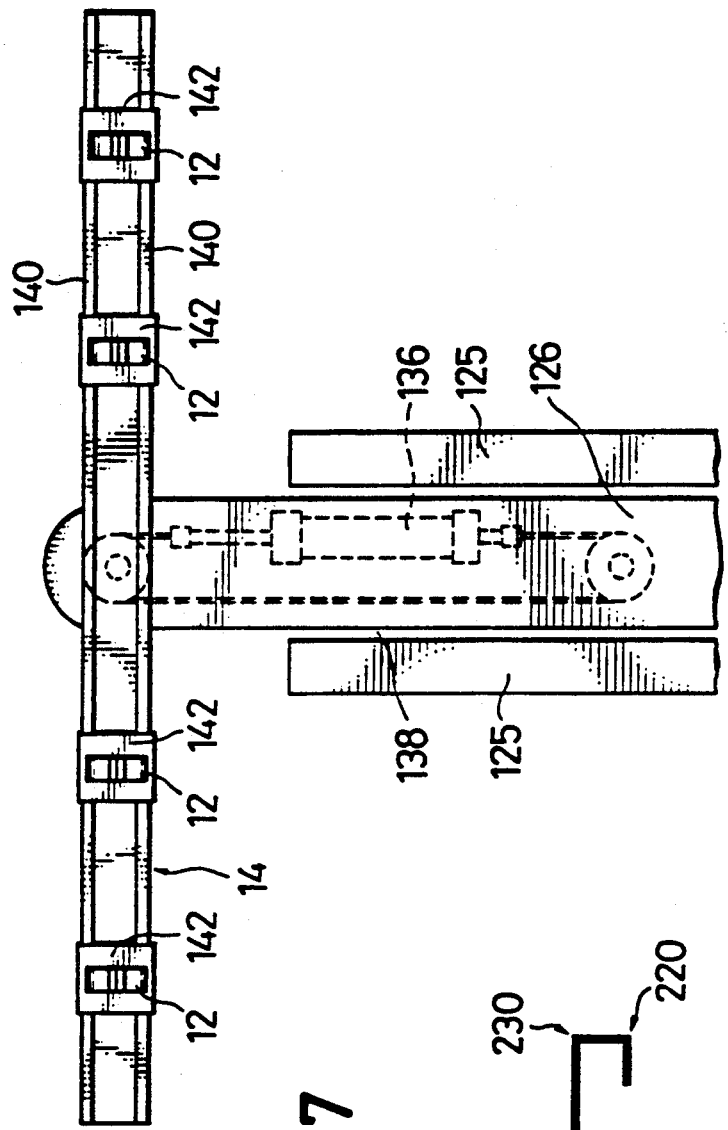
FIG. 6 is a partial front elevation view of the support structure for the auxiliary pincer illustrated in FIG. 5.

As illustrated in FIGS. 1, 2 and 6, a robust supporting column 124 is fixed to the floor on the side of the base 32 opposite that facing the press 1, which column includes two facing box-like uprights 125. Between the uprights 125 there is located a robust oscillating box-like arm 126 supported by the uprights 125 by means of a pin 128.

In one of the uprights 125 there is incorporated a vertical actuator 130 (FIG. 2). Associated with the arm of the actuator 130 there is a pulley block 132 for a chain 134 anchored to the arm 126.

Finally, the arm 126 carries a beam 14 which carries spaced pincers 12 at its front and is mounted so as to be rotatable through 180° at the free upper end of the oscillating arm 126.

Within the arm 126 there is incorporated a double acting longitudinal pneumatic actuator 136 which controls the rotation of the beam 14 about the support axis on the arm 126 by means of a chain transmission 138.

The structure comprising the arm 126, the beam 14 and the pincers 12 can be made to oscillate, by means of the actuator 130, between the inclined position illustrated in solid outline in FIG. 2 and the vertical raised position illustrated in broken outline in FIG. 2.

In FIG. 2 the beam 46 and one of the support arms 74 of the manipulator heads 10 are shown in solid outline in the lowermost position of greatest advance towards the press 1, and in broken outline in the uppermost and most retracted position. The reference numeral 139 indicates the manipulation space within which the common axis of rotation of the manipulator head 10 and the auxiliary support head 116 can move.

Figure 5:
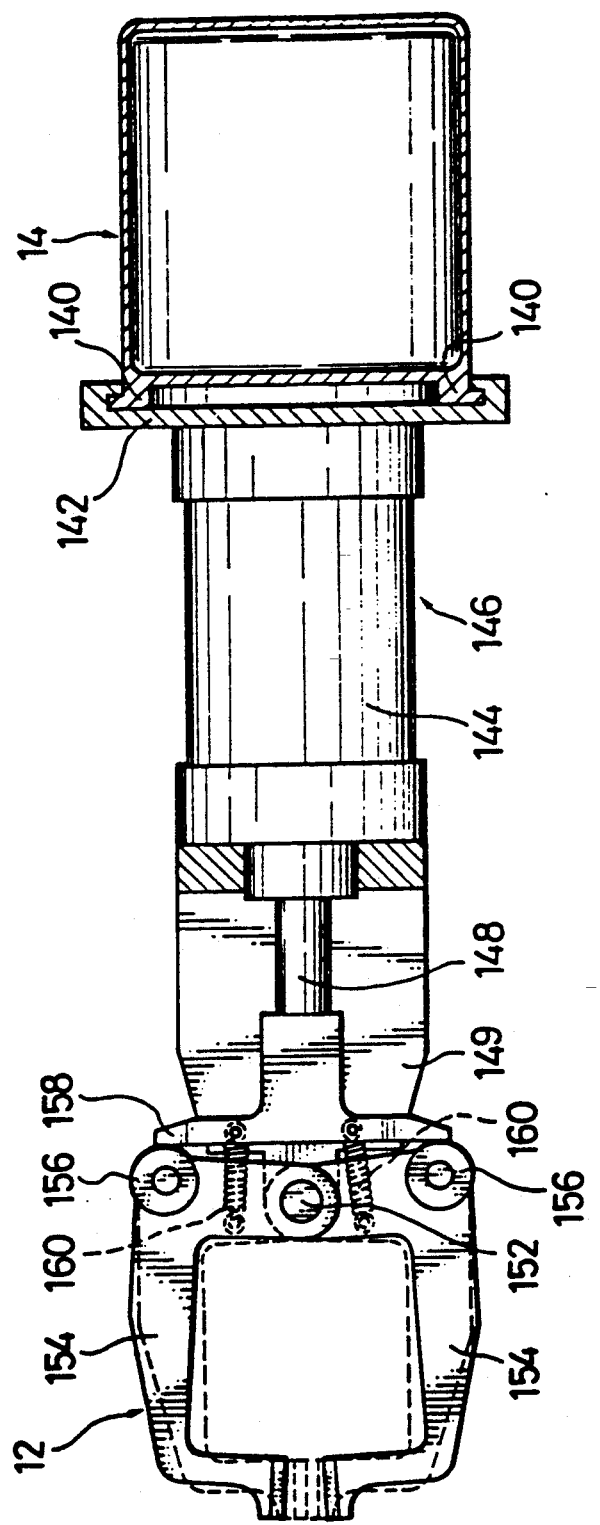
FIG. 5 is a partially sectioned side view of an auxiliary pincer of the manipulator device of FIG. 1, and of the beam which supports it.

Referring to FIGS. 5 and 6, the beam 14 has a pair of longitudinal guides 140 along which are mounted four slides 142 which are manually displaceable and lockable on the guides themselves in the positions considered most convenient.

As illustrated in FIG. 5, each slide 142 has fixed to it the cylinder 144 of a double acting pneumatic actuator 146. The arm of the actuator 146 is indicated 148 and projects forwardly with respect to the beam 14.

The cylinder 144 carries a bracket 150 which surrounds the arm 148 and carries a transverse pin 152. The pin 152 constitutes a central fulcrum for the two symmetrical jaws 154 of the auxiliary pincer 12.

Each jaw 154 is provided with a pair of lateral rollers 156. The arm 148 is provided with a front plate 158 with which the rollers 156 cooperate.

Between the plate 158 and each jaw 154 are interposed tension coil springs 160 hooked into respective cavities or seats of the plate and the jaw.

The arrangement is such that when the actuator 146 and the plate 158 are retracted, the springs 160 maintain the pincer 12 open with the jaws 154 separated, as illustrated in solid outline in FIG. 5.

When pressure is introduced into the actuator 146 the arm 148 advances and the plate 158 presses on the rollers 156 forcing the jaws 154 to close. This situation is illustrated in broken outline in FIG. 5.

Figure 12:
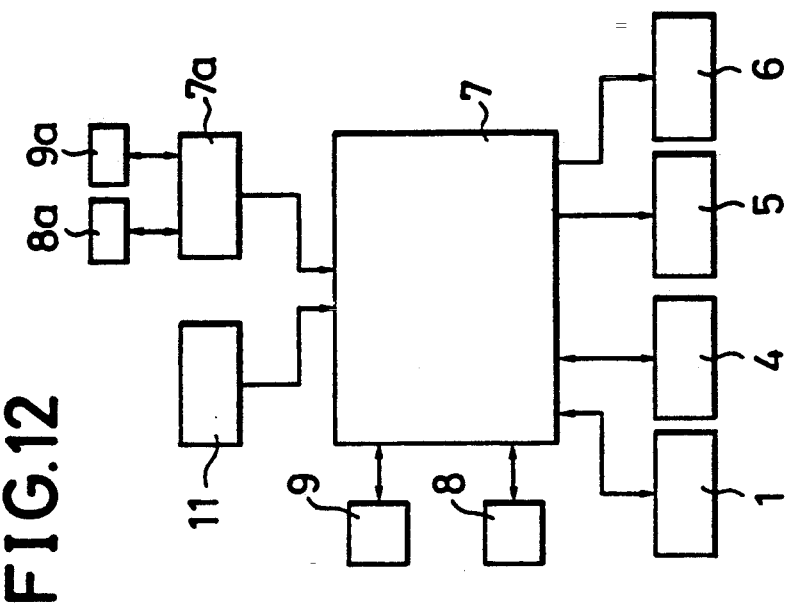
FIG. 12 schematically illustrates the interconnections between the electronic command and control unit, illustrated in FIG. 1, and the various devices connected to it.

In FIG. 12 the interconnections between the electronic control unit 7 and the various devices connected to it and controlled by it are shown schematically. In particular, the electronic unit 7 controls the press 1, the manipulator device 4, the loader device 5, and the discharge table 6 (if automated with a device for removing the finished pieces from the plane 30). The electronic unit 7 is moreover provided with a portable keyboard 11 and a keyboard 8 utilised to create a sequence of control signals in a manner which will be explained clearly hereinbelow. The electronic unit 7 is finally provided with a video 9 for visualisation of the sequence of control signals, and can be connected to an external unit 480, indicated in broken outline, which can be utilised both for the generation and for the memorisation of sequences of control signals.

Figure 7:
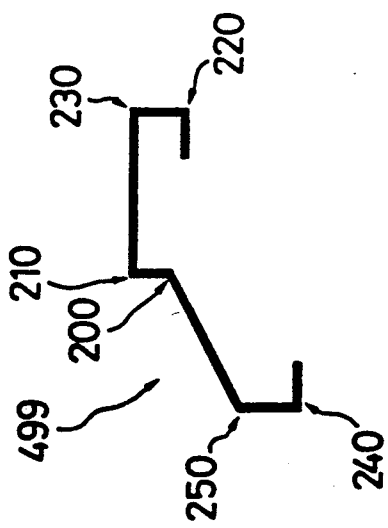
FIG. 7 represents a shaped sheet metal profile made with the installation illustrated in FIG. 1.

In FIG. 7 there is shown the profile of a shaped workpiece 499 having six parallel bend lines 200, 210, 220, 230, 240 and 250 obtained from a flat metal sheet 23 of rectangular form by a bending cycle which will be described in detail with reference to FIGS. 8a to 8q.

Figure 8A:
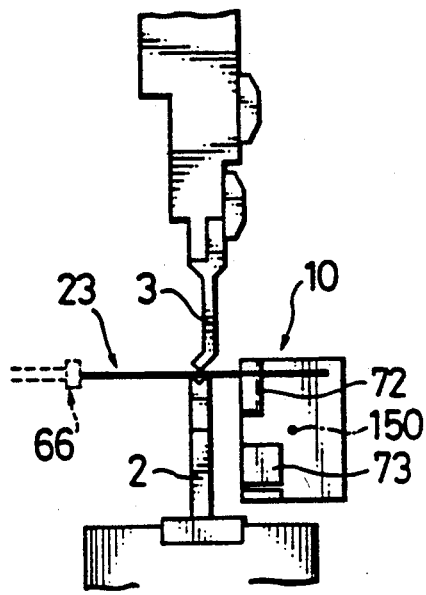
FIGS. 8a-8j and 8l-8q schematically illustrated the successive bending stages necessary to obtain the profile illustrated in FIG. 7.
Figure 8B:
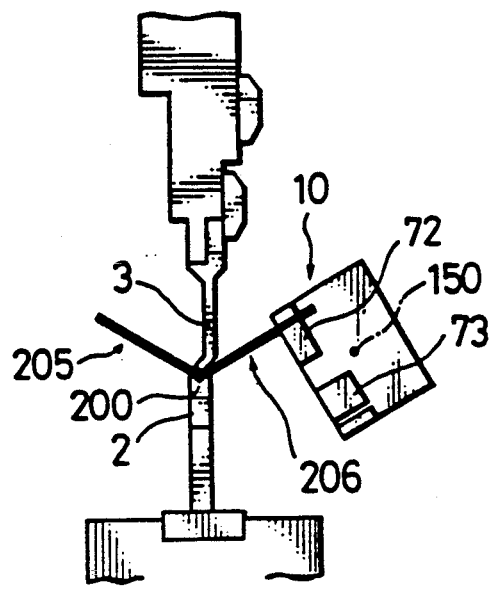
Figure 8C:
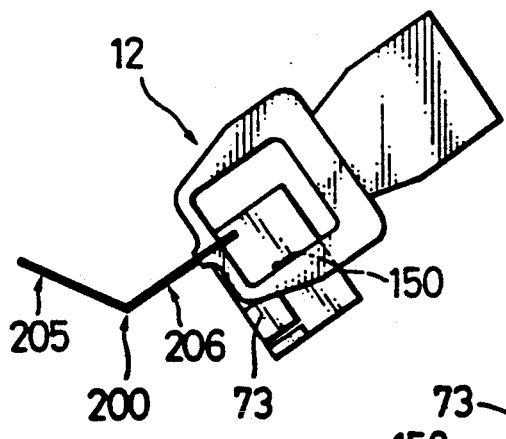
Figure 8D:
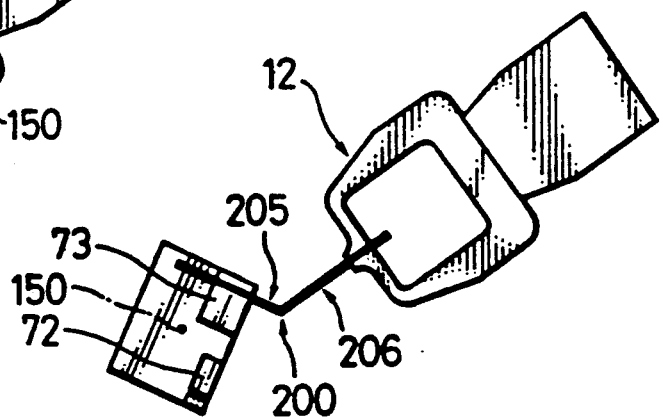
Figure 8E:
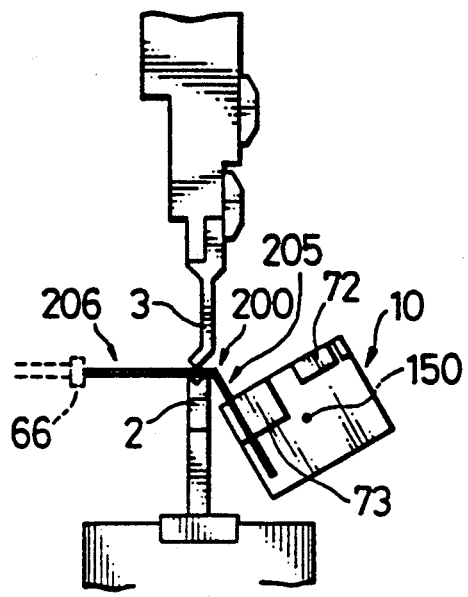
Figure 8F:
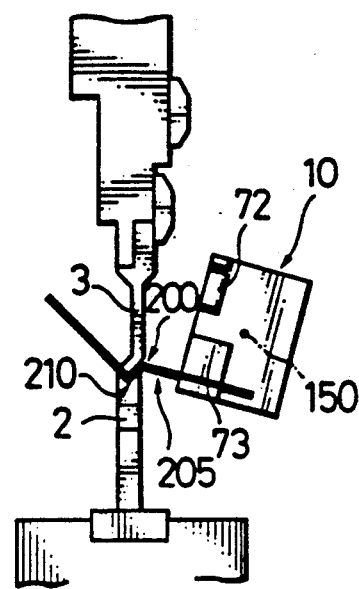
Figure 8G:
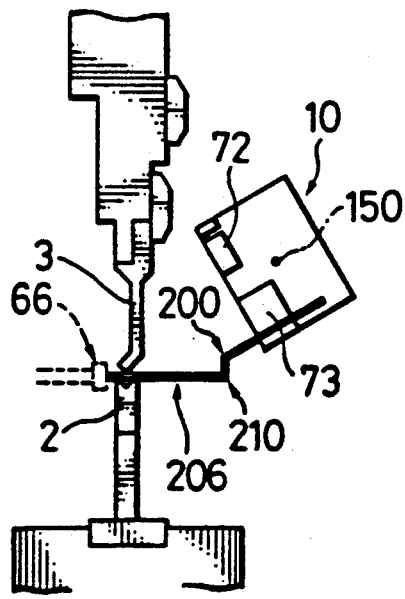
Figure 8H:
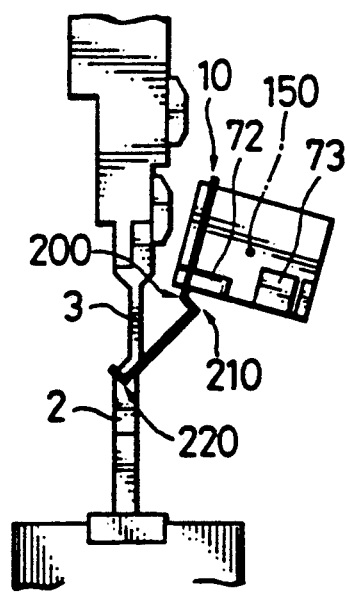
Figure 8I:
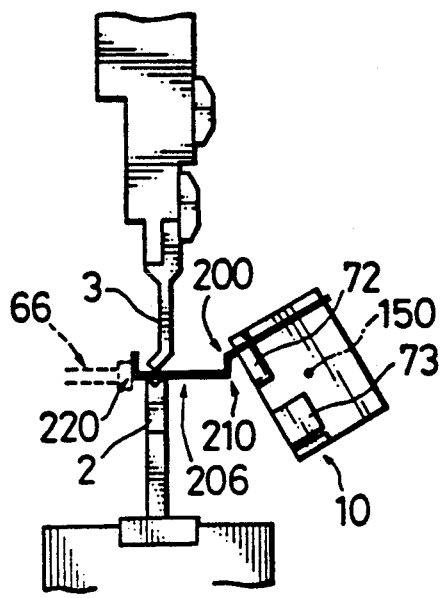
Figure 8J:
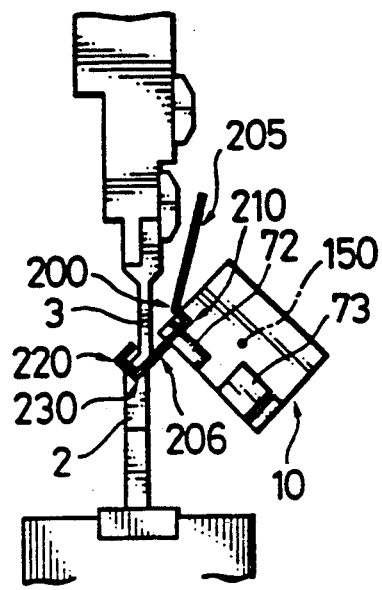
Figure 8L:
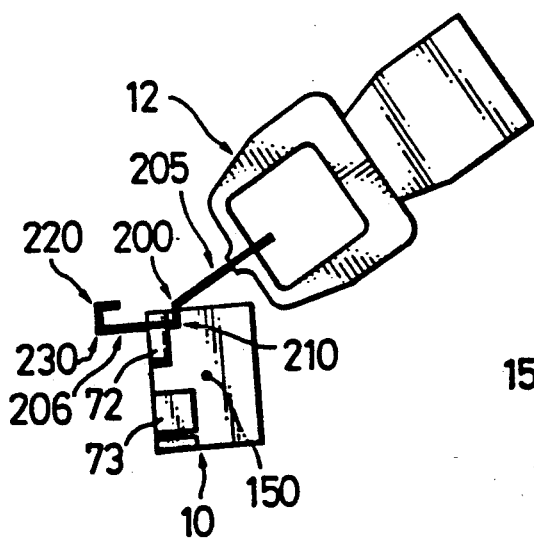
Figure 8M:
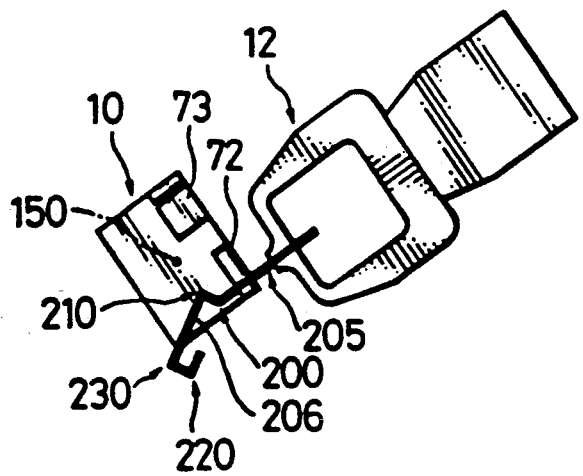
Figure 8N:
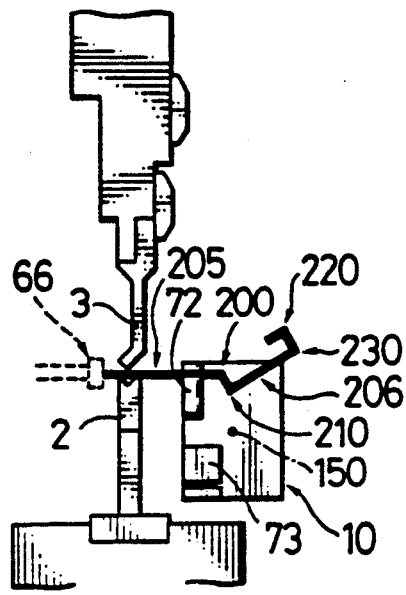
Figure 8O:
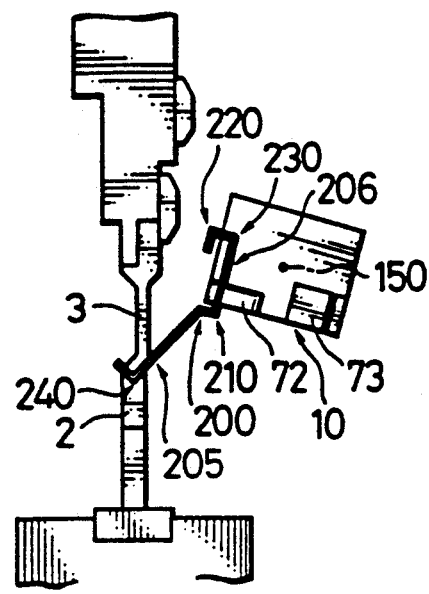
Figure 8P:
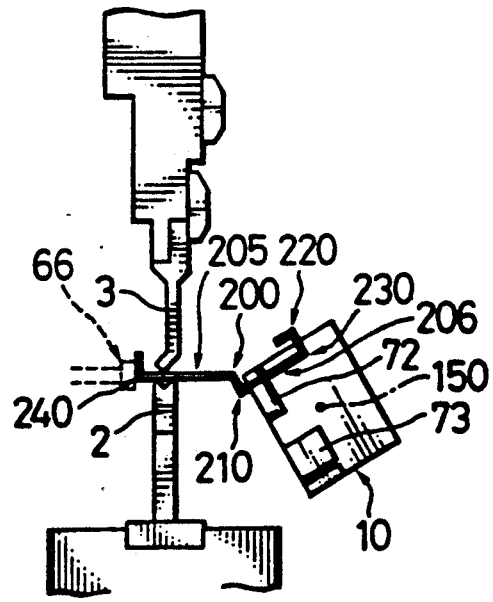
Figure 8Q:
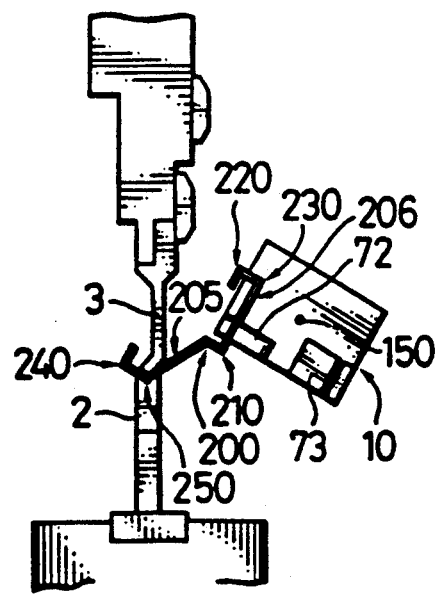

In these FIGS. 8a–8q the bending press 1 is schematically illustrated as comprising the lower die 2 and the upper die 3. In the illustrated example the die 2 is fixed, whilst the die 3 is reciprocally movable in a vertical working plane. The die 2 has a hollow profile with a dihedral angle and the die 3 has a complementary convex profile with a dihedral angle. In the example illustrated the dihedral angle is 90° and is symmetrical with respect to the working plane.

As previously mentioned, the manipulator device 4 comprises a pair of manipulator heads 10 which carry respective manipulator pincers 72 and 73. These pincers 72 and 73 are illustrated in FIGS. 8a–8q in a different position from that illustrated in FIG. 3; in particular the pincers 72 and 73 have gripper openings on the same side of the head 10 and are movable in unison and in opposition (closure and opening) with respect to one another.

Each manipulator head 10 is mounted rotatably about an axis 150 common to the two heads.

With reference to FIG. 8a, the metal sheet 23, after it has been released by the loader device 5, is taken by the manipulator device 4, and in particular is gripped by the manipulator pincers 72 thereof, which carries it between the dies 2 and 3 of the press 1, which are still in the open position. The heads 10 are caused to rise simultaneously until they carry the sheet 23 onto the die 2 with the rear edge of the sheet 23 coming into contact with the ends 68 of the sensors 66; in this way the sensors 66 emit a signal which indicates that the sheet 23 has reached, within the interior of the press 1, the predetermined position for the formation of the first bend 200 at the predetermined height. The die 2 and the die 3 are then caused to advance towards one another in such a way as to retain the sheet 23 without bending it.

In the subsequent phase the two manipulator pincers 72 open and the two heads 10 move apart disengaging the sheet 23.

The following phase is the bending phase in which the die 3 is further lowered and forms the bend 200 in the sheet 23.

At the end of this bending operation, as can be seen in FIG. 8b, there are formed two leaves 205 and 206 in the sheet 23, which form between them an angle of about 100°.

In the subsequent phase, also illustrated in FIG. 8b, whilst the sheet 23 is still clamped between the two dies 2 and 3, the heads 10 rise and rotate assuming an attitude such that the pincers 72 lie in a gripping plane which coincides with the plane of the leaf 206 facing the pincers 72, and can regrip the sheet 23.

After the sheet 23 has been gripped again the die 3 rises and the heads 20 move away from the press 1 until they reach the region of the auxiliary pincers 12 as schematically shown in FIG. 8c.

The auxiliary pincers 12 lie in an inclined gripping plane. To permit the gripping of the sheet 23 by the auxiliary pincers 12, in their rising motion moving away from the press 1 the heads 10 have been caused to rotate in such a way as to carry the leaf 206 of the sheet 23 into correspondence with this plane. As illustrated in FIG. 8c, the auxiliary pincers 12 grip the longitudinal edge of the sheet 23.

In the subsequent phase the manipulator pincers 72 disengage from the lateral edges of the sheet 23 and move away.

In the following phase (FIG. 8d) the manipulator heads 10 rotate through more than 180° about their axis 150 and the manipulator pincers 73 grip the edge of the leaf 205 of the sheet 23, whilst the auxiliary pincers 12 subsequently open and move away with the raising of the arm 126.

In the next successive phase the two heads 10 are again lowered, turning about the axis 150, and advanced to bring the leaf 206 of the sheet 23 to rest on the edges of the die 2. As illustrated in FIG. 8e, the sheet 23 is rested on the die 2 in such a way that the rear edges of the leaf 206 are aligned with the ends 68 of the sensors 66 positioned along the Y axis at a height corresponding to the production of the second bend 210.

Subsequently the die 3 descends to the position shown in FIG. 8e and the manipulator pincers 73 release the sheet 23 retained between the two dies.

In the following phase (FIG. 8f) the die 3 descends further forming the second bend 210.

Then the heads 10 rise again and upon turning grip the leaf 205 of the sheet 23 with the pincers 73.

In the subsequent phase (FIG. 8g) after the press 1 has opened again, the heads 10 are reorientated, positioning the leaf 206 of the sheet 23 in such a way that its edge comes into contact with the sensors 66, repositioned for the production of the third bend 220. The sheet 23 is then locked in the press 1, released by the pincers 73, and then the third bend 220 is formed (FIG. 8h).

Subsequently the head 10 performs a rotation about its axis 150 and translates gripping the sheet 23 by-means of the pincers 72 (FIG. 8h).

In the following phase the press 1 is opened again and the leaf 206 of the sheet 23 is inserted between the die 2 and the die 3 until the rear edge comes into contact with the sensors 66 as illustrated in FIG. 8i, for the production of the fourth bend 230. Subsequently the sheet 23 is released from the pincers 72 and the press 1 forms the fourth bend 230. As can be established from FIG. 8j, after the production of the fourth bend a part of the leaf 206 of the sheet 23 envelops the die 3. This prevents or renders difficult the disengagement of the sheet 23 from the die 3 during its rising movement.

The two heads 10 gripping the sheet 23 with the pincers 72 are therefore raised and simultaneously rotated about their axis of rotation 150 during the elevation of the die 3 so as to release the sheet 23 from the die 3 (tracking).

After the sheet 23 has been completely removed from the press 1 the heads 10 move completely away from the press 1 to reach the auxiliary pincers 12 as schematically shown in FIG. 8l.

The auxiliary pincers 12 grip the edge of the leaf 205 of the sheet 23 (FIG. 8l) along its longitudinal edge, and the manipulator pincers 72 disengage from the lateral edges of the leaf 206; subsequently (FIG. 8m) the auxiliary pincers 12 invert the sheet 23 by rotation of the beam 14, then the manipulator pincers 72 grip the leaf 205 of the sheet 23 again, and finally the auxiliary pincers 12 open and move away.

In the next successive phase (FIG. 8n) the two heads 10 move down again, reorientate themselves with the gripper plane of the pincers 72 horizontal and advance to carry an edge of the leaf 205 of the sheet 23 into contact with the sensors 66 at the height prearranged for the production of the fifth bend 240.

Subsequently the manipulator pincers 72 release the sheet 23 retained between the die 2 and the die 3, and the die 3 descends to the position corresponding to FIG. 8o, and forms the fifth bend 240.

Subsequently the pincers 72 grip the leaf 206 of the sheet 203 again, the press 1 is re-opened and the head 10 displaced in such a way as to position the leaf 205 of the sheet 23 as illustrated in FIG. 8p. After this the sheet 23 is locked between the die 2 and the die 3 and the pincers 72 open releasing the sheet 23. Finally the press 1 closes further (FIG. 8q) in such a way as to form the sixth and final bend 250 in the leaf 205 of the sheet 23. After this the pincers 72 grip the completely shaped piece 499.

The press 1 is then re-opened and the manipulator device 4 moves to the discharge table 6 where the pincers 72 release the workpiece 499 which falls onto the plane 30 of the table 6.

In the working cycle just described it has been supposed, for simplicity, that the pincers 72 and 73 always grip the leaf of the sheet 23 closest to the fold to be formed, but the programme of the working cycle can arrange, for certain bending phases, for the farther leaf to be gripping.

The creation in the electronic unit 7 of the command and control signals for a sheet metal bending cycle of the type illustrated above is conveniently achieved by means of the system described herein and in related copending U.S. Patent application Ser. No. 07/721,653 by the same applicant entitled "System for Creating Command and Control Signals for a complete of the Operating Cycles of a Robot Manipulator Device of a Sheet Metal Bending Installation"by Simulating the Operating Environment.

The electronic unit 7 is in fact provided with a programme by which it is possible, by means of the portable keyboard 11 (hand box), or possible by means of the keyboard 8, to define a complete sequence of operating phases which can be performed by the sheet metal bending installation 500.

Figure 11:
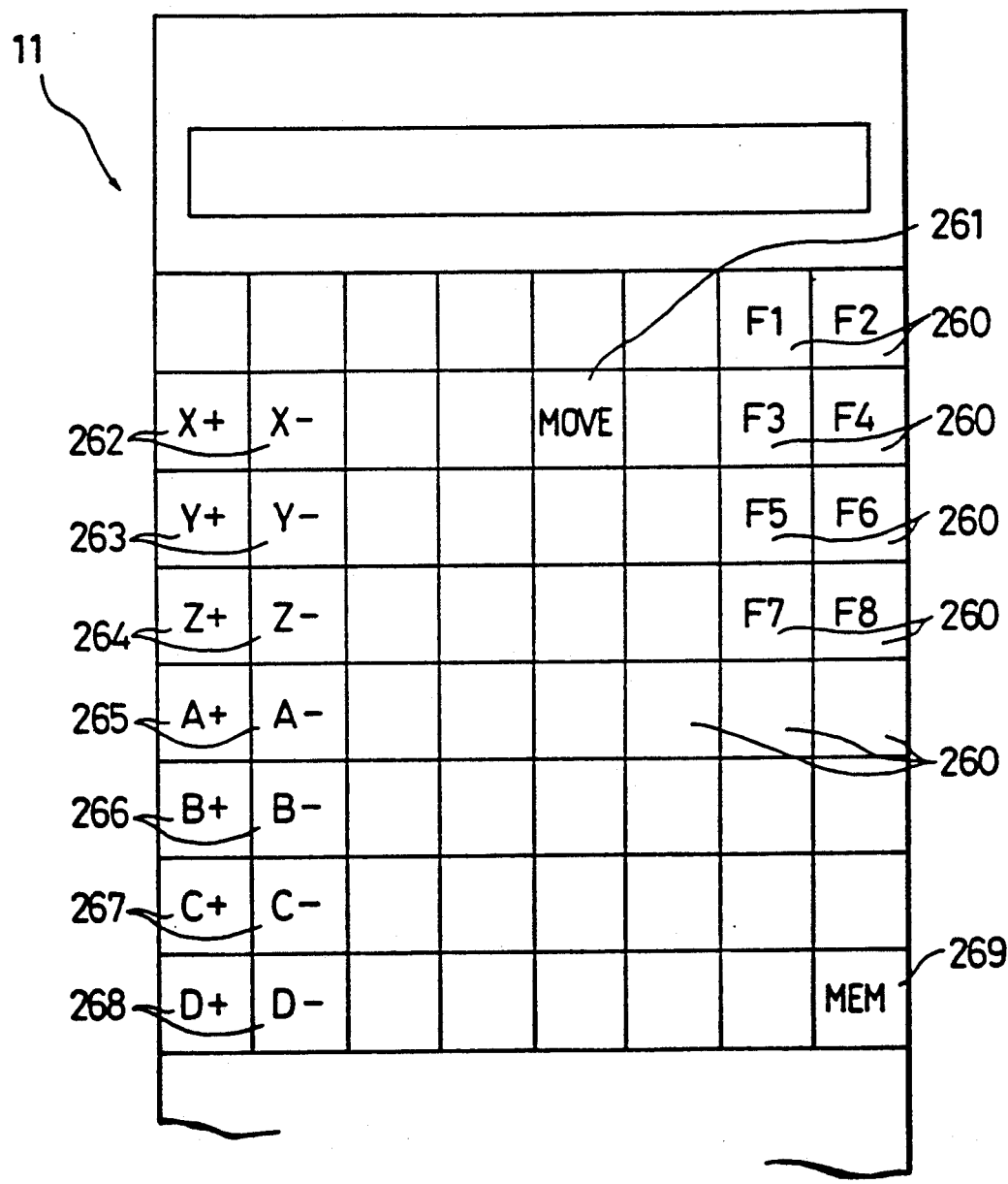
FIG. 11 illustrates a portable keyboard (hand box) utilised to send to the command and control unit of FIG. 1 the command signals necessary for the production of the profile illustrated in FIG. 7.

With particular reference to FIG. 11 the keyboard 11 is provided with a plurality of function keys 260 each of which is adapted to define a complete sequence of command and control signals for the sheet metal bending installation 500, for a respective phase in the cycle by which a shaped sheet metal profile is formed, for example of the type illustrated in FIG. 7. These sequences of control and command signals, corresponding to each of the function keys 260, are conveniently memorised in a memory block of the electronic unit 7.

In particular, the keys 260 are indicated with a letter "F" to define that this key is a function key, and with a number, indicated after the letter "F", to distinguish the various operating functions which can be achieved by means of the keys 260.

With reference to FIG. 11, the various function keys 260 are listed and their significance is explained as follows:

F1—command opening of the pincers 72
F2—command closure of the pincers
F3—command opening of the pincers 73
F4—command closure of the pincers 73

F5—raise the auxiliary metal sheet support device 110 and command activation of the upper suckers 120

F6—raise the auxiliary metal sheet support device 110 and command activation of the lower suckers 119

F7—command lowering of the auxiliary metal sheet support device 110 and disactivate the suckers 119 and 120

F8—raise the auxiliary metal sheet support devices 110 and 121 and command activation of the upper suckers 120 and 123

F9—raise the auxiliary metal sheet support devices 110 and 121 and command activation of the lower suckers 119 and 122

F10—command lowering of the auxiliary metal sheet support devices 110 and 121, and disactivate the suckers 119, 120, 122 and 123

F13—command closure of the auxiliary pincers 12 and approach of the beam 14 to the press 1

F14—command opening of the auxiliary pincers 12 and approach of the beam 14 to the press 1

F15—command rotation of the beam 14 and then inversion of the metal sheet 23

F17—execute the alignment procedure to align the metal sheet 23 against the rear sensors 66 of the press 1, and grip, without deformation, the metal sheet 23 between the die 2 and the die 3

F18—command the press 1 to perform the bending operation on the sheet 23 between the die 2 and the die 3

F19—command opening of the press 1 and disengagement of the metal sheet 23 from the press 1 when a part of the sheet 23 envelops the die 3 (tracking), with simultaneous displacement of the manipulator heads 10

F20—command opening of the press 1 and disengagement of the metal sheet 23 from the press 1 without displacement of the manipulator heads 10

F21—command initiation of the alignment procedure of the metal sheet 23 within the press 1, with the required positioning of the sensors 66 along the Y axis F22—command loading of the sheet 23 by the loader device 5 by activation of the suckers 28 and displacement of the beam 24 into the gripping position for the manipulator device 4.

F23—command separation of the sheet 23 from the loader device 5 by disactivation of the suckers 28

F24—command the execution of an initial positioning procedure of the auxiliary metal sheet devices 110 and 121, and of the beam 14.

The keyboard 11 (hand box), is also provided with other keys which can also be used in combination with the function keys 260 to define other instructions which can be executed by the sheet metal bending installation 500. In particular, the keyboard 11 includes a key 261 indicated with the symbol "MOVE" adapted to define command signal instructions for translation of the manipulator device 4 along three axes X, Y and Z. The "MOVE" key 261 is also able to define instructions for signals commanding rotation of the heads 10 about their common axis 150, displacement of the head 10 along the axis X, and finally rotation of the beam 14 and inclination of the arm 126.

The "MOVE" key 261 is utilised jointly with other keys on the keyboard 11 to define a vector which comprises all the movements listed above and definable by the "MOVE" key itself.

For the definition of these movements the (hand box) keyboard 11 includes:

two keys 262 indicated "X+" and "X−" operable to impart to the beam 46 of the manipulator device 4 a movement in one direction or the other along the X axis; two keys 263 indicated "Y+" and "Y−" operable to impart to the beam 46 of the manipulator device 4 a movement in one direction or the other along the Y axis;

two keys 264 indicated "Z+" and "Z−" operable to impart to the beam 46 of the manipulator device 4 a movement in one direction or the other along the Z axis;

two keys, 265 indicated "A+" and "A−" operable to impart to the heads 10 a clockwise rotation or an about their common axis 15 two keys 266 indicated "B+" or "B−" operable to displace the heads 10 in one direction or the other along the X axis simultaneously and in opposite directions;

two keys 267 indicated "C+" and "C−" operable to impart to the beam 14 a clockwise or an anti-clockwise rotation about the central support axis of the arm 126;

and, two keys 268 indicated "D+" and "D−" operable to impart to the arm 126 a clockwise or an anti-clockwise rotation about the pin 128.

Purely by way of non-limitative example, there will now be indicated a vector which includes the instructions for the command signals defined with the "MOVE" key 261 together with the keys 262-268.

This vector can be of the form:

$$\text{MOVE} (\pm X, \pm Y, \pm Z, \pm A, \pm B, \pm C, \pm D)$$

where MOVE is the instruction defined by the key 261 and X, Y, Z, A, B, C and D are the numerical values inserted by means of the keys 262-268 which represent how far and in which direction the beam 46 of the manipulator 4, the heads 10, the beam 14, and the arm 126 must move with respect to an initial position.

Moreover it can happen that it is necessary to impart to the manipulator 4 or to the heads 10 instructions to perform consecutive movements; in this case the key 261 can be utilised successively to create a sequence of vectors of the type:

$$\text{MOVE} (\pm X_1, \pm Y_1, \pm Z_1, \pm A_1, \pm B_1, \pm C_1, \pm D_1)$$

$$\text{MOVE} (\pm X_2, \pm Y_2, \pm Z_2, \pm A_2, \pm B_2, \pm C_2, \pm D_2)$$

$$\text{MOVE} ( \dots )$$

$$\text{MOVE} (\pm X_n, \pm Y_n, \pm Z_n, \pm A_n, \pm B_n, \pm C_n, \pm D_n)$$

The keyboard 11 further includes a "MEM" key 269 for memorisation of the previously made key selections, and the manner of operation of this will be described in more detail below.

Figure 9:
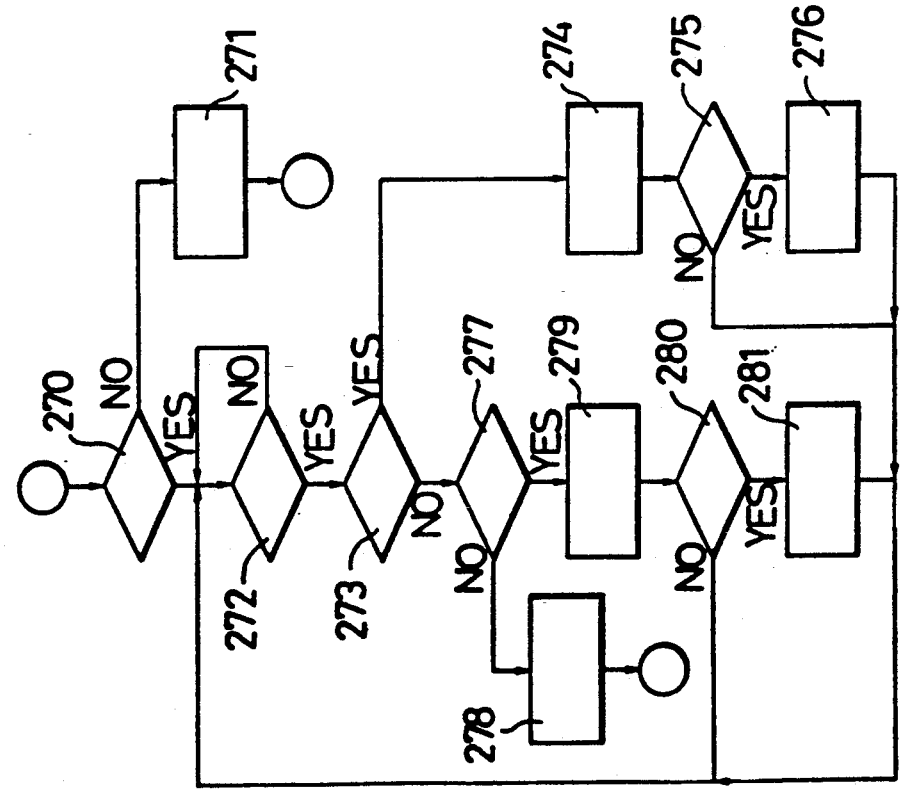
FIG. 9 is a flow chart of the operation of the electronic command and control unit illustrated in FIG. 1.

FIG. 9 is a flow chart illustrating the operations performed by the electronic command unit 7 to create the basic sequence of command and control signals for the bending installation 500 so as to be able then to perform the bending cycle previously described to produce the profile illustrated in FIG. 7.

With reference to FIG. 9 the initial block 270 detects if the creation of a new sequence of operating phases has been requested by the operator, for example with the selection on the keyboard 8 or 11, or if the execution of previously memorised operating phases has been requested.

If the creation of a new sequence has been requested the system passes from block 270 to block 272 which detects if a key of the keyboard 11 (hand box) has been pressed. In the negative case it remains in closed cycle in this block waiting for a key to be pressed. If a key has already been pressed, from block 272 the system passes to a block 273 which detects if a function key 260 has been pressed. In the positive case, from the block 273 it passes to a block 274 which commands execution of the phases determined by the function key 260 which has been pressed. From block 274 it passes to a block 275 which detects if the memorisation of the selected function key has been requested by means of the key 269. In the positive case it passes to a block 276 which effects memorisation of the command signals defined by the selected function key 260, and the successive return to the block 272 to wait for a new selection on the keyboard 11. If this memorisation has not been requested, it returns from block 275 to block 272 directly.

Returning to block 273, if this block detects that a function key 260 has not been pressed it passes to a block 277 which detects if the key pressed is the key 261 to define a sequence of movements. If a key has been pressed which is not a key defining a sequence of movements, it moves from block 277 onto a block 278 which commands execution of the operation requested with this key, and subsequent exit from the programme. If the block 277 detects that the key 261 defining an instruction for movement has been pressed, it passes to a block 279 which commands execution of the movement requested by means of the keys 262-268. From block 279 it then moves to a block 80 which detects if memorisation of the selected movements has been requested by means of the key 269. In the positive case it moves from block 280 to a block 281 which effects memorisation of the command signals defined with the selected movement keys 262-268, and then returns to the block 272, whilst if such memorisation has not been requested, it returns from block 280 to block 272 directly.

On the other hand, if execution of previously memorised operating phases is requested, as described with reference to blocks 272-281, it passes from block 270 to a block 271 which commands execution of these operating phases as will be explained in more detail hereinbelow. Subsequently, when execution of these operating phases is completely finished, it exits from the programme.

FIGS. 10a and 10b are a flow chart illustrating its operation of the electronic unit 7 with the system of FIG. 9, and define the sequence of command and control signals for the bending installation 500 to perform the bending cycle previously described with reference to FIGS. 8a-8j and 8l and 8q to obtain the workpiece 499 of FIG. 7. This arrangement therefore has a sequence of blocks which comprise instructions for movement of the parts of the installation (heads 10, press 1, loader device 5 etc) or instructions for the operation of the installation (defined by the said function keys 260).

With reference to FIGS. 10a and 10b, the process starts initially at a block 300 which initiates the general starting procedures of the programme. From block 300 it passes to a block 301 which comprises the instructions for the signals to command the loader device 5 to take up the sheet 23 and for the lateral positioning of the bed 20 over the sliding zone of the beam 46 on the guide 34; these instructions are determined by activation of-the function key 260 indicated F22 on the keyboard 11.

From block 301 it passes to a block 302 by means of which the predetermined initial positioning of the auxiliary support devices 110 and 121 and of the beam 14 are defined; this block having been created with the activation of the function key indicated F24.

From the block 32 it passes to a block 303 comprising the instructions for the signals commanding the pincers 72 to open, determined by activation of the function key F1.

From block 303 it passes to a block 304 which comprises, with a previously defined "MOVE" vector, the sequence of instructions created by activation of the key 261 and keys 262 for the coarse movement signals defining the movement of the manipulator device 4 towards the bed 20 for loading the sheet 23.

It then passes to a block 307 which comprises the instructions, created by activation of the key 261 and keys 262, 263, 264, 265, 266 for the final and precise movement of the beam 46 and the gripper heads 10 of the manipulator device 4 so as to carry it and the pincers 72 into the gripping position at the edges of the sheet 23; from this block 307 it moves on to a block 308, defined by the function key F2, which comprises the instructions for the signals for commanding closure of the pincers 72 to grip the sheet 23.

From block 308 it passes to a block 309 defined by the function key F8, which comprises instructions for command signals for raising the auxiliary support devices 110 and 121 which support the sheet 23, and activation of the suckers 120 and 123.

From the block 309 it then passes to a block 310 defined by the function key F23, which comprises the instructions for separating the loader device 5 from the sheet 23 by means of disactivation of the suction from the suckers 28.

From block 310 it passes to a block 311 comprising, with the MOVE vector, the instructions for movement of the beam 46 of the manipulator 4 towards the press 1 (carrying the sheet 23); this block 311 is followed by a block 470, defined by the function key F21 which comprises the instructions for command signals for the sensor positioning procedure (sensors 66) which define the depth of alignment of the sheet 23 into the press 1 (FIG. 8a).

The block 470 is followed by a block, 471 which comprises the instructions for the command signals for moving the heads 10 and the beam 46 of the manipulator device 4 to bring the rear edge of the sheet 23 up to the sensors 66. From block 471 it passes to a block 312, defined by the function key F17, which comprises the instructions for signals commanding the procedure for alignment of the sheet 23 in the press 1, in the position for forming the first bend 200, and lowering of the die 3 into contact with the sheet 23 to retain it in position.

The block 312 is followed by a block 313, defined by function key F1, which comprises the instructions for the command signals for opening the pincers 72.

From block 313 it passes to a block 314 which comprises the instructions for command signals for withdrawing the manipulator heads 10 from the manipulation space 139.

From the block 314 it moves onto a block 315 defined by the function key F18, which comprises the instructions for command signals to the press 1 to form the first bend 200.

From block 315 it passes to a block 316, defined by the activation of the function key F10, comprising the instructions for command signals to lower the support devices 110 and 121 and disactivate the suckers 120 and 123.

From block 316 it passes to a block 317 which comprises the instructions for the command signals for movement of the manipulator head 10 towards the bent sheet 23.

From block 317 it passes to a block 319 which comprises the instructions for command signals for the final and precise movement of the manipulator device 4 in such a way that the manipulator heads 10 arrive at a position such as to grip the folded sheet 23 (FIG. 8b). Subsequently it passes from block 319 to a block 320, defined by function key F2, comprising the instructions for command signals for closure of the pincers 72 to grip the sheet 23.

From block 320 it passes to a block 321, defined by function key F8, which comprises instructions for command signals to raise the auxiliary support devices 110 and 121 as already described.

From block 321 it passes to a block 322 defined by the activation of the function key F20, which comprises the instructions for command signals for opening the press 1 and release of the metal sheet 23.

From block 322 it then passes to a block 323 which comprises the instructions for the command and control signals for moving the manipulator 4 (which supports the bent sheet 23) towards the auxiliary pincers 12 (FIG. 8c).

From block 323 it passes to a block 324 defined by the function key F13, which comprises the instructions for command signals for closure of the auxiliary pincers 12 to grip the sheet 23.

The block 324 is followed by a block 325, defined by function key F1, which comprises the instructions for the command signals for opening the pincers 72 to release the sheet 23.

From the block 325 it passes to a block 326 which comprises the sequence of instructions for command signals to withdraw the device 4 from the manipulation space 139.

From block 326 it passes to a block 327, defined by function key F10, comprising the instructions for the command signals for lowering the devices 110 and 121.

The block 327 is followed by a block 330 defined by function key F3, which comprises the instructions for opening the pincers 73.

From block 330 it passes to a block 331 which defines the commands for movement of the heads 10 of the manipulator devices 4 towards the auxiliary pincers 12 to grip the sheet 23 again on the outermost leaf 205 (FIG. 8d).

Subsequently, from block 331 it passes to a block 332, defined by function key F4, comprising the instructions for command signals to control closure of the pincers 73 to grip the sheet 23.

From block 332 it passes to a block 333 defined by function key F14, which comprises the instructions for the command signals to control the re-opening of the auxiliary pincers 12 to release the sheet 23.

From block 333 it passes to a block 334 which defines the commands for movement of the heads 10 of the manipulator device 4, with the sheet 23, towards the press 1.

The block 334 is followed by a block 335, defined by function key F21, which comprises the instructions for the signals to command the procedure for positioning the sensors 66 (FIG. 8e).

The block 335 is followed by a block 336 which comprises the instructions for the command signals for movement of the heads 10 and the beam 46 of the manipulator device 4 to cause the rear edge of the sheet 23 to approach the sensors 66.

From block 336 it passes to a block 337 defined by function key F17, which comprises the instructions for command signals for the procedure for alignment of the sheet 23 in the press 1, and gripping it between the dies 2 and 3.

The block 337 is followed by a block 338, defined by function key F3, which comprises the instructions for signals commanding opening of the pincers 73.

From block 338 it passes to a block 340 which comprises the instructions for command signals for withdrawal of the heads 10 of the device 4 from the bending zone.

From the block 340 it moves on to a block 341, defined by function key F18, which comprises the instructions for command signals to the press 1 to form the second bend 210 (FIG. 8f).

From block 341 it passes to a block 342 which comprises the instructions for the command signals for movement of the heads 10 of the manipulator device 4 towards the sheet 23, which now has the two bends 200 and 210.

The block 342 is followed by a block 343 which comprises the instructions for signals commanding the final and precise movement of the manipulator device 4 in such a way that the pincers 73 of the manipulator head 10 are moved to a position adapted to grip the leaf 205 of the bent sheet 23.

Subsequently, after the block 344 is passes to a block 345 defined by function key F4, which comprises instructions for command signals for closure of the pincers 73 to grip the sheet 23.

From block 345 it passes to a block 346, defined by function key F20, which comprises instructions for command signals for opening the press 1 and release of the metal sheet 23.

From block 346 it passes to a block 347 which comprises the instructions for command signals for controlling movement of the manipulator heads 10, for repositioning the metal sheet 23 in the press 1.

The block 347 is followed by a block 350, defined by function key F21, which comprises the instructions for command signals for controlling the procedure for repositioning the sensors 66, for achieving the third bend 220 (FIG. 8g).

The block 350 is followed by a block 351 which comprises the instructions for signals commanding the movement of the head and the beam 46 of the manipulator device 4 to bring the rear edge of the sheet 23 up to the sensors 66.

From block 351 it passes to a block 352 defined by function key F17, which comprises the instructions for the signals commanding the procedure for alignment of the sheet 23 in the press 1, and gripping it between the dies 2 and 3.

The block 351 is followed by a block 353, defined by the function key F3, which comprises the instructions for signals commanding opening of the pincers 73.

From block 353 it passes to a block 354 which comprises the instructions for signals commanding disengagement of the heads 10 of the device 4 from the bending zone.

From block 354 it passes to a block 355, defined by the function key F18, which comprises the instructions for signals commanding the press 1 to form the third bend 220 (FIG. 8h).

The block 355 is followed by a block 356 defined by the function key F1, which comprises the instructions for the signals commanding opening of the pincers 72 to prepare them for the subsequent gripping of the sheet 23.

From block 356 it passes to a block 357 which comprises the instructions for signals commanding movement of the heads 10 of the manipulator device 4 towards the sheet 23, which now has three bends 200, 210, 220.

The block 357 is followed by a block 359 which comprises the instructions for the command signals for the final and precise movement of the manipulator device 4 in such a way that the pincers 72 of the manipulator heads 10 are moved into a position adapted to grip the leaf 205 of the bent sheet 23.

Subsequently, after block 359 it passes to a block 360, defined by function key F2, which comprises the instructions for the signals commanding closure of the pincers 72 to grip the sheet 23.

From block 360 it passes to a block 361, defined by the function key F20, which comprises the instructions for signals commanding the opening of the press 1 and release of the metal sheet 23.

From block 361 it passes to block 364, defined by the function key F8, which comprises the instructions for command signals to raise the auxiliary support devices 110 and 121, activating the suckers 120 and 123.

From block 364 it passes to a block 365 which comprises the instructions for command signals for the movement of the manipulator heads 10, for repositioning the leaf 206 of the metal sheet 23 in the press 1.

The block 365 is followed by a block 366, defined by function key F21, which comprises the instructions for command signals for the procedure for repositioning the sensors 66 for forming the fourth bend (FIG. 8i).

The block 366 is followed by a block 367, defined by the function F17, which comprises the signals for commanding the procedure for alignment of the sheet 23 in the press, and gripping it between the dies 2 and 3.

The block 367 is followed by a block 368, defined by the function key F1, which comprises the instructions for the signals for commanding opening of the pincers 72.

From block 368 is passes to a block 370 which comprises the instructions for command signals for withdrawal of the heads 10 of the device 4 from the bending zone.

From block 370 it passes to a block 371, defined by function key F18, which comprises the instructions for command signals to the press 1 to form the fourth bend 230 (FIG. 8j).

From block 371 it moves on to a block 372, defined by the function key F10, which comprises the instructions for command signals for lowering and disactivation of the auxiliary support devices 110 and 121.

From block 372 it passes to a block 373 which comprises the instructions for the command signals for movement of the heads 10 of the, manipulator device 4 towards the sheet 23, which now has four bends 200, 210, 220 and 230.

The block 373 is followed by a block 375 which comprises the instructions for command signals for the final and precise movement of the manipulator device 4 in such a way that the pincers 72 of the manipulator heads 10 are disposed in a position suitable for gripping the leaf 206 of the bent sheet 23.

After the block 375 it passes to a block 376, defined by the function key F2, which comprises the instructions for command signals for the closure of the pincers 72 to grip the sheet 23.

From block 376 it passes to a block 377, defined by the function key F8, which comprises the instructions for command signals to raise the auxiliary support devices 110 and 121.

From block 377 it passes to a block 378, defined by the function key F19, which comprises the instructions for signals commanding opening of the press 1 and the simultaneous movement of the manipulator heads 10 for the disengagement of the metal sheet 23.

From block 378 it passes to a block 379 which comprises the instructions for command signals for the movement of the manipulator 4 (which supports the bent sheet 23) towards the auxiliary pincers 12 (FIG. 8l).

From block 379 it passes to a block 380, defined by the function key F13, which comprises the instructions for command signals for closing the auxiliary pincers 12 to grip the metal sheet 23.

From block 380 it passes to a block 381, defined by the function key F1, which comprises the instructions for command signals for opening the pincers 72 of the heads 10.

From block 381 it passes to a block 382 which comprises the instructions for command signals for withdrawal of the device 4 from the manipulation space 139.

From block 382 it passes to a block 383, defined by the function key F10, which comprises the instructions for command signals for lowering the devices 110 and 121.

From block 383 it passes to a block 384, defined by the function key F15, which comprises the instructions for command signals for rotating the beam 14 and lowering the sheet 23(FIG. 8m).

From block 384 it passes to a block 385 which comprises the instructions for the signals commanding movement of the heads 10 towards the auxiliary pincers 12.

From block 385 it passes to a block 450, defined by function key F2, which comprises the instructions for signals commanding closure of the pincers 72.

The block 450 is followed by a block 451, defined by function key F14, which comprises the instructions for the command signals for opening the auxiliary pincers 12.

From block 451 it passes to a block 452 which comprises the instructions for the command signals for movement of the head 10 towards the press 1.

The block 452 is followed by a block 386, defined by function key F21, which comprises the instructions for signals commanding the procedure for a new positioning of the sensors 66 (FIG. 8n).

The block 386 is followed by a block 387, defined by the function key F17, which comprises the instructions for signals commanding the procedure for alignment of the sheet 23 in the press 1 and gripping it between the dies 2 and 3.

The block 387 is followed by a block 388, defined by the function key F1, which comprises the instructions for signals commanding opening of the pincers 72.

From block 388 it passes to a block 390 which comprises the instructions for signals commanding withdrawal of the heads 10 of the device 4 from the bending zone.

From block 390 it passes to a block 391, defined by function key F18, which comprises the instructions for signals commanding the press 1 to form the fifth bend 240 (FIG. 8o).

The block 391 is followed by a block 460 which comprises the instructions for command signals for movement of the heads 10 of the manipulator 4 towards the sheet 23 which now has five bends 200, 210, 220, 230 and 240.

The block 460 is followed by a block 392 which comprises the instructions for signals commanding the final and precise movement of the manipulator device 4 in such a way that the pincers 72 of the manipulator heads 10 are disposed in a position adapted to grip the leaf 206 of the bent sheet 23.

Subsequently, from block 392 it passes to a block 393, defined by the function key F2, which comprises the instructions for command signals for closing the pincers 72.

From block 393 it passes to a block 461, defined by function key F20, which comprises the instructions for signals commanding opening of the press 1, and release of the metal sheet 23.

The block 461 is followed by a block 394 which comprises the instructions for signals commanding the movement of the manipulator heads 10, and the repositioning of the metal sheet 23 in the press 1 (FIG. 8p).

From block 394 it passes to block 395, defined by function key F21, which comprises the instructions for signals commanding the procedure for the new positioning of the sensors 66.

The block 395 is followed by a block 396, defined by the function key F17, which comprises the instructions for the signals commanding the procedure for aligning the sheet 23 in the press 1, and gripping it between the dies 2 and 3.

The block 396 is followed by .a block 397, defined by the function key F1, which comprises the instructions for signals commanding the opening of the pincers 72.

From block 397 it passes to a block 400 which comprises the instructions for the signals commanding withdrawal of the heads 10 of the device 4 from the bending zone.

From block 400 it moves on to a block 401, defined by the function F18, which comprises the instructions for the command signals to the press 1 to form the sixth, and final, bend 250 (FIG. 8q).

From the block 401 it passes to a block 402 which comprises the instructions for the command signals for movement of the heads 10 of the manipulator device 4 towards the finished workpiece 499.

The block 402 is followed by a block 404 which comprises the instructions for the command signals for final and precise movement of the manipulator device 4 in such a way that the manipulator heads 10 are disposed in a position adapted to grip the bent workpiece 499.

Subsequently, from block 404 it passes to a block 405, defined by the function key F2, which comprises the instructions for command signals for closure of the pincers 72.

From block 405 it passes to block 406, defined by the function key F20, which comprises the instructions for command signals for opening the press 1 and release of the workpiece 499.

From block 406 it passes to a block 410 which comprises the instructions for command signals for the movement of the manipulator device 4 to the position for transforming the workpiece 499 to the discharge table 6.

The block 410 is followed by a block 411, which comprises the instructions for command signals for the final and precise movement of the manipulator device 4 in such a way that one side of the workpiece 499 rests on the inclined support plane 30 of the discharge table 6.

From block 411 it passes to a block 412, defined by the function key F1, which comprises the instructions for command signals for opening the pincers 72 to release the workpiece 499.

From block 412 then it leaves the sheet bending phases definition cycle.

The flow chart illustrated in FIG. 10 and described above is then executed by the unit 7 by means of the command block 271 (FIG. 9) for performing the production cycle and producing the profile illustrated in FIG. 7.

The advantages obtained with the first embodiment capable of automatic creation of the command and control signals for the phases of working cycles of a robot manipulator device of a sheet metal bending installation are evident from what has been described; in fact, by means of the function keys 260, the operator selecting the appropriate functional key originates a desired sequence (more or less complex) of operating phases of the installation which can be associated with possible other automatic functions for controlling the performance of these preselected phases and/or the sequencing thereof without having to define every step of these phases.

The sequence of command signals, of the type described above, is treated by the electronic unit 7, with the system constituting the subject of the present invention, which provides for increasing the working speed of the sequence itself.

Figure 13:
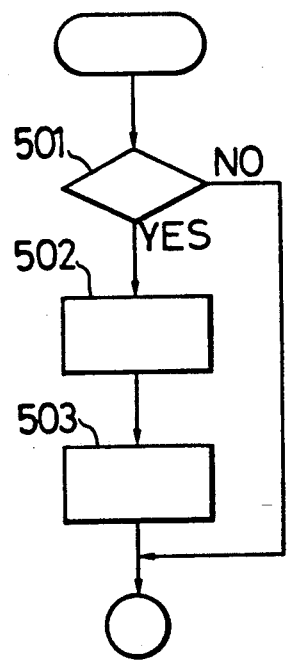
FIG. 13 is a flow chart of the operation of the command and control unit of the system forming the subject of the present invention.

In particular, the electronic unit 7 comprises, as illustrated in FIG. 13, a first block 501 which checks if a sequence of command and control signals for the manipulator device 4 and the system 500 already exists; if this sequence does not exist it exits from the programme, on the other hand if this sequence does exist it passes to a second block 502 which effects a first increase in the speed of the sequence.

The block 502 acts on the instructions for displacement command signals for the manipulator device 4, defined conveniently with the "MOVE" key, and initially checks if the "MOVE" type instructions are isolated, or if they are grouped in a sequence. If the "MOVE" instructions are isolated they are not modified. If instead these "MOVE" type instructions are grouped in a set of two or move consecutive instructions the block 502 associates each instruction of the group with the following one.

In particular, the block 502 associates together the pairs of numerical values X, Y, Z, A, B, C, D of two consecutive "MOVE" instructions (which correspond to the position assumed by the heads 10 and the arm 126 with the beam 14 in a first and in a second position) in such a way as to approximate the trajectory passing through the said positions, and therefore to reduce the time taken for the displacement. This association operation is repeated for all the pairs of successive "MOVE" instructions in such a way that a movement of the heads 10 which has been defined by means of a complex trajectory constituting the sum of individual trajectories between a number of positions, is speeded up in that each individual trajectory is modified and recorded with the adjacent trajectories; it is therefore not necessary to have to stop in the intermediate positions, but only to stop in the final position, defined by the last "MOVE" instruction of the group, which has not been modified.

The block 502 further determines, before the said association between the "MOVE" instructions, a testing of the successive "MOVE" instructions at each bending phase of the press 1, and generates, before the sheet 23 is taken again by the heads 10, a synchronisation and control signal obtained after the bend execution command so as to allow the correct completion of the bending phase and subsequent secure gripping by the heads 10 without having to wait for completion of the bending phase before initiating the movement of the heads 10 towards the sheet 23.

Figure 14A:
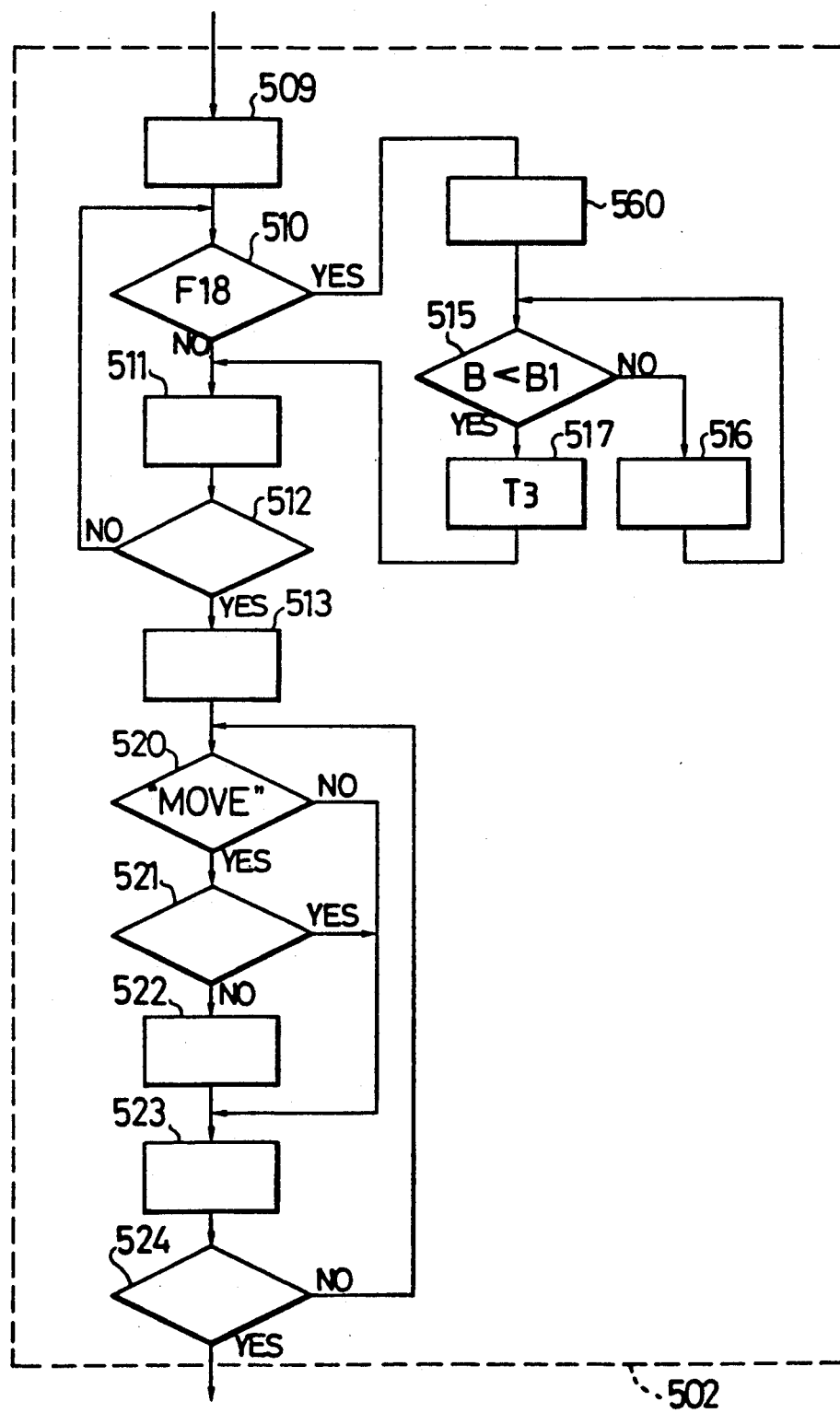
FIGS. 14a and 14b are flow charts showing more detail than the flow chart of FIG. 13.

In particular, with reference to FIG. 14a, from block 502 it passes to a first block 509 which commands analysis of the first instruction of the flow chart illustrated in FIGS. 10a and 10b and formed as described, then moves on to a block 510 which detects if this instruction relates to the command for execution of a bend in the sheet 23, defined by the function key F18; if not it moves on to a block 511 which commands analysis of a subsequent instruction of the flow chart of FIGS. 10a and 10b, and then moves onto a block 512 which detects if this instructions is the last instruction of the cycle. If not it returns to the block 510, whilst if it is it moves on to a subsequent block 513. In the case of a positive condition detected by the block 510 it moves on to a block 560 which associates, to the block for commanding execution of a bend, conveniently defined by the function key F18, the commencement of a parallel sequence for obtaining this synchronisation and control signal T3, and then moves onto a block 515 which detects if the instruction under examination commands the final and precise positioning of the pincers 72 or 73 of the heads 10 at the sides of the sheet 23, which is detectable for example by means of the value of the dimension B of the "MOVE" instruction by referring it to the positioning of the heads 10 along the X-axis with respect to a central reference point on the beam 46, and testing if this value B is less than a value B1; if not this indicates that the instruction under examination still relates to a displacement before this final and precise positioning of the pincers 72 or 73 of the heads 10 against the edges of the sheet 23 so that it moves on to a block 516 which commands analysis of a subsequent instruction of the flow chart of FIG. 10a and 10b, and then returns to the block 515, whilst if it is it moves on to a block 517 which imposes a delay on the synchronisation and control signal T3 until this instruction is detected, and then moves on to the block 511 for continuation of the analysis of the instructions of the cycle. With this block 517 there is therefore introduced a block 517' to command the delay in the signal T3, between the blocks 317 and 319 of FIG. 10a, as can be seen in the final block diagram obtained according to the present invention and illustrated in FIGS. 15a and 15b, and similarly blocks 517' are inserted between the other pairs of corresponding blocks 342–344, 357–359, 373–375, 460–392, 402–404. Moreover, the block 560 links the commencement of the sequence to obtain the signal T3 to each of the blocks 315, 341, 355, 371, 391 and 401 for commanding the formation of a bend.

The block 513 then in turn commands analysis of the first instruction of the flow chart illustrated in FIGS. 10a, 10b then moves on to a block 520 which detects if this instruction is of the "MOVE" type, and if so moves on to a block 521 which detects if this instruction is isolated, that is to say relates to a displacement between two individual points: if not it moves on to a block 522 which associates this "MOVE" instruction to the subsequent "MOVE" instruction as already indicated, and then moves on to a block 523 which commands the analysis of a subsequent instruction of this block diagram of FIGS. 10a and 10b. It also moves directly to this block 523 following detection of the negative condition of the block 520 or the positive condition of the block 521. From block 523 it moves to block 524 which detects if this instruction is the last one of the cycle. If it is not it returns to block 520, whilst if it is it exits from block 502.

Subsequently, from block 502 (FIG. 13) it passes to a block 503 which effects the "parallelisation" of the sequences of command signals of the operations for discharge of the finished workpiece 499 onto the discharge table 6, loading of a new metal sheet 23 from the magazine 5, and movement of the heads 10. This means that the block 503 modifies and optimises the sequences of command signals relating to the movement of the manipulator device 4 and the loader device 5, in such a way that when the manipulator device 4 is positioned to release the finished workpiece 499 on the discharge table 6 the initiation of the new phase of loading a metal sheet 23 from the magazine 5 is commanded and, moreover, before the gripping of the new sheet 23 with the heads 10 there is a delay in the synchronisation and control signal T2 following the command for the sheet 23 to be lifted by the loading device 5 so as to allow the correct positioning of the sheet 23 over the beam 46 by the loading device 5.

Figure 14B:
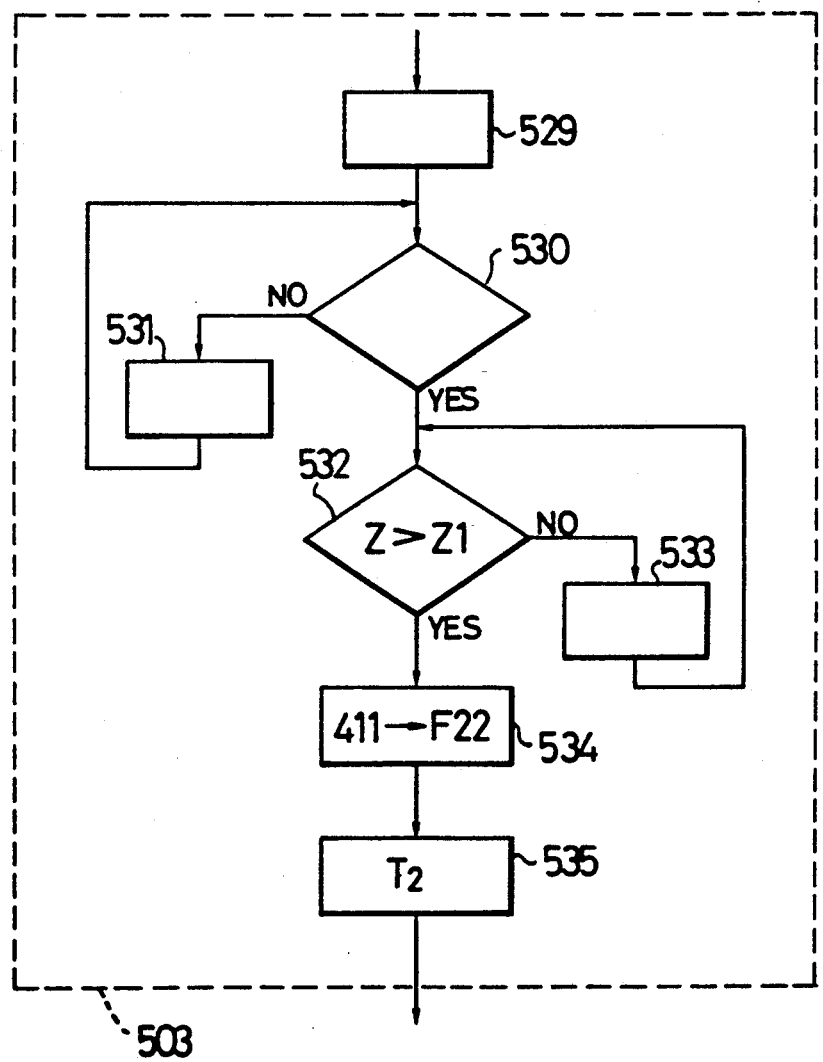

In particular, with reference to FIG. 14b, within block 503 there is a first block 529 which commands analysis of the first instruction of the flow chart illustrated in FIGS. 10a and 10b, which then moves on to a block 530 which detects if this instruction relates to the command to form a final bend in the sheet 23, defined by the function key F18; in the negative case it moves on to a block 531 which commands analysis of a subsequent instruction of this block diagram of FIGS. 10a and 10b, and then returns to block 530, whilst in the positive case it moves on to a subsequent block 532 which detects if the instruction under examination commands the final and precise positioning of the manipulator device 4 in such a way that the workpiece 499 is lowered on to the inclined plane 30 of the discharge table 6, detectable for example by means of the value of the dimension Z of the move instruction referring to the positioning of the height of the heads 10, and checking if this value Z is greater than a value Z1; in the negative case this indicates that the instruction under examination still relates to a displacement preceding this final and precise positioning of the heads 10 with respect to the discharge table 6 so that it moves on to a block 533 which commands the analysis of a subsequent instruction of the flow chart of FIGS. 10a and 10b, and then returns to the block 532, whilst in the positive case it moves on to a block 534 which causes the loading device 5 to commence lifting the sheet 23 and positioning it over the sliding zone of the beam 46, and moreover causes the commencement of a parallel sequence for obtaining the synchronisation and control signal T2. In particular this block 534 inserts a block 301' functionally similar to the block 301 of FIG. 10a, between blocks 411 and 412 of the FIG. 10b flow chart, as can be seen in the final flow chart shown in FIG. 15b.

From block 534 it moves on to block 535 which determines the delay in the signal T2 before the final and precise movement of the beam 46 and the gripper heads 10 of the manipulator device 4 to the grip position to grip the sides of the sheet 23, which is defined by the block 307 of FIG. 10a. With this block 535 there is therefore inserted a block 535' for commanding a delay in the signal T2, after the block 412 and before a block 307, as can be seen in the final flow chart according to the present invention and illustrated in FIG. 15b; this block 307 is then followed by a block 308 and thereafter, as illustrated in FIG. 10a, by a new bending cycle. With reference to FIG. 14b, from block 535 it exits from block 503, and from block 503 (FIG. 13) it exits from the system of the present invention for increasing the speed of operation of the sequence of command and control signals for the bending installation 500.

Figure 15B:
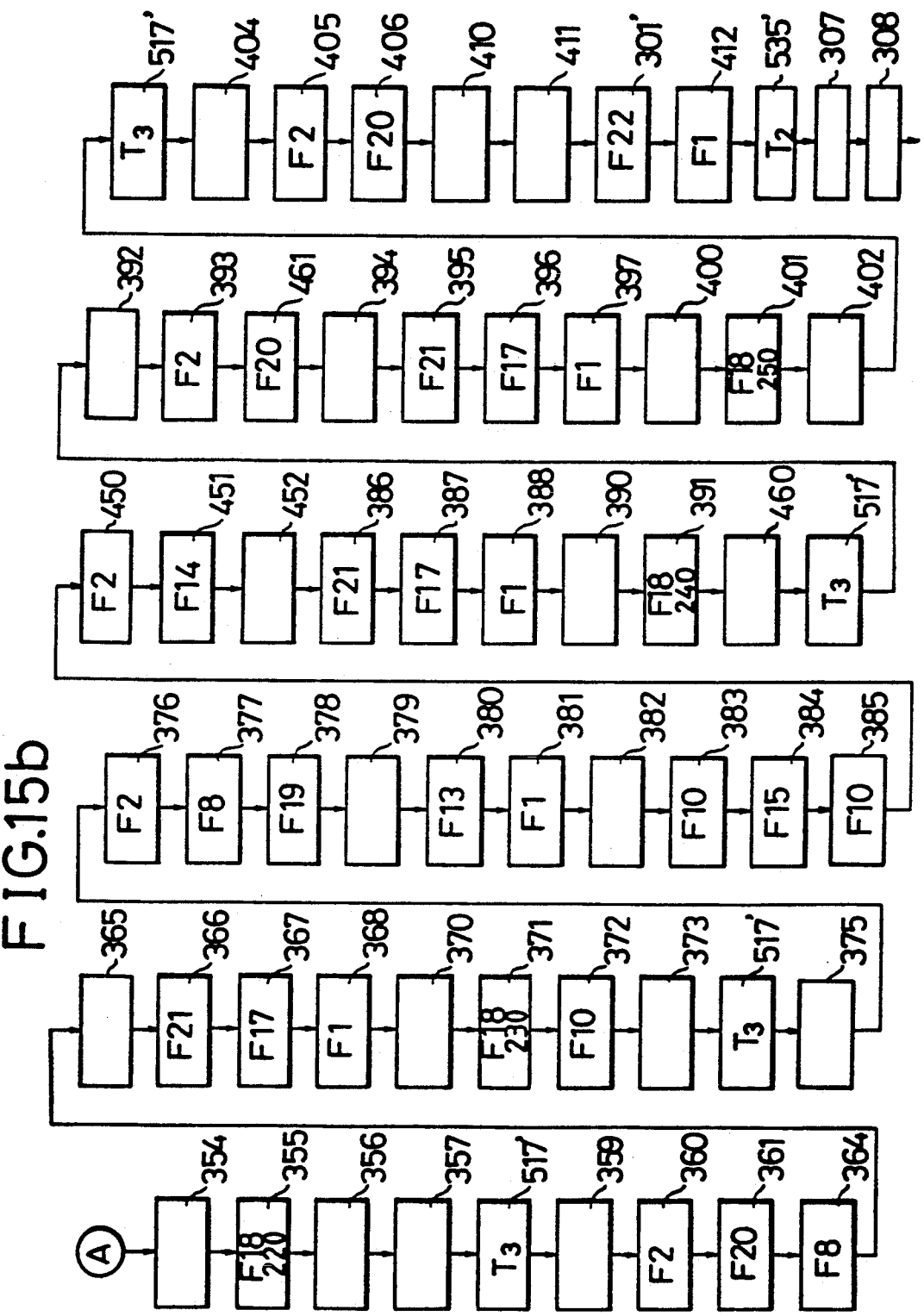
Figure 18:
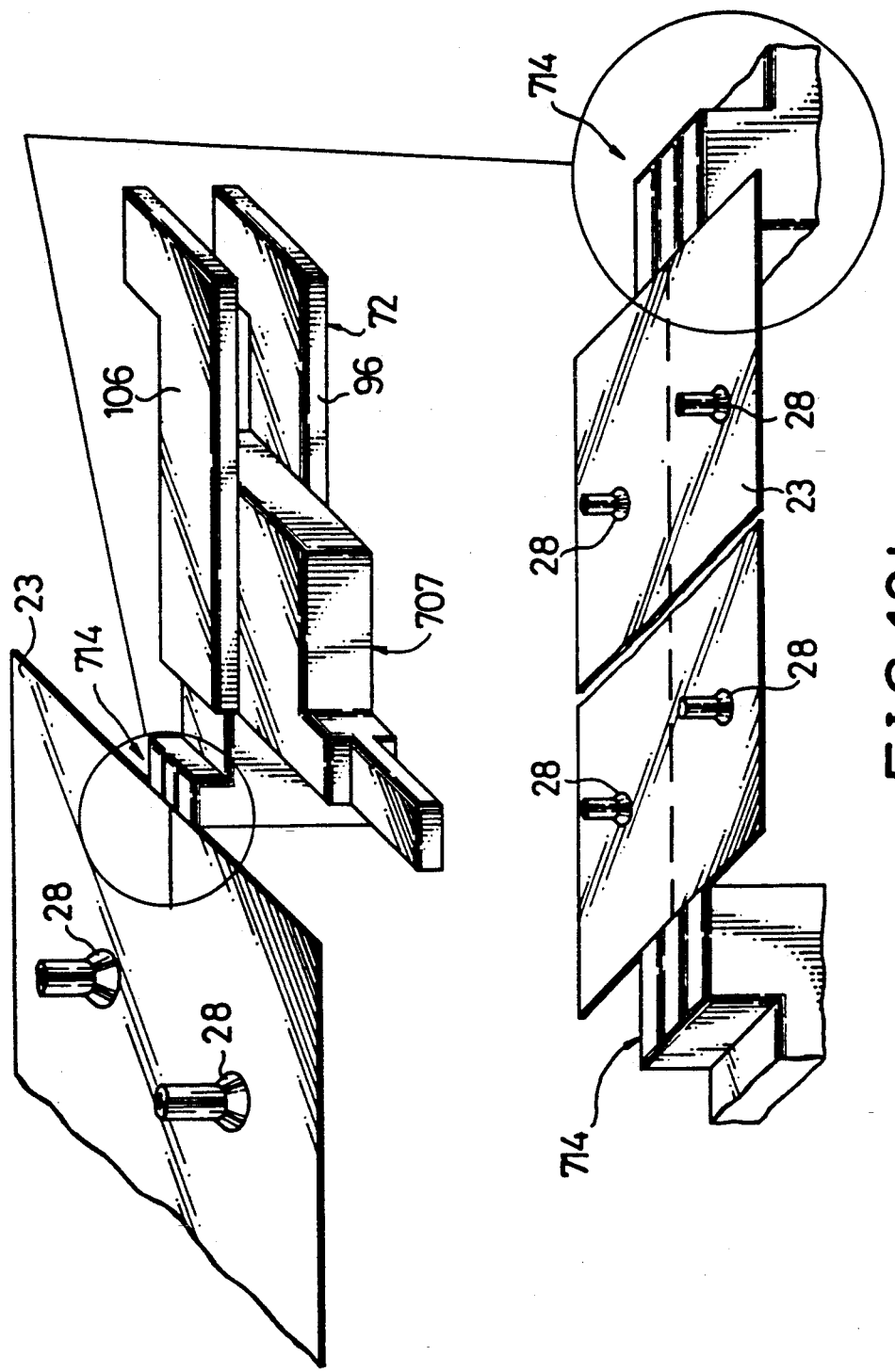
FIG. 18a is a perspective view of the block of FIG. 16b, utilised by a manipulator head (partially represented) of the installation of FIG. 1, in a second dimension checking stage according to the system of the present invention, shown against a metal sheet (partially shown)
FIG. 18b is a partial perspective view of a pair of blocks in the second dimensional checking stage of FIG. 18a, at opposite sides of a metal sheet.
Figure 19:
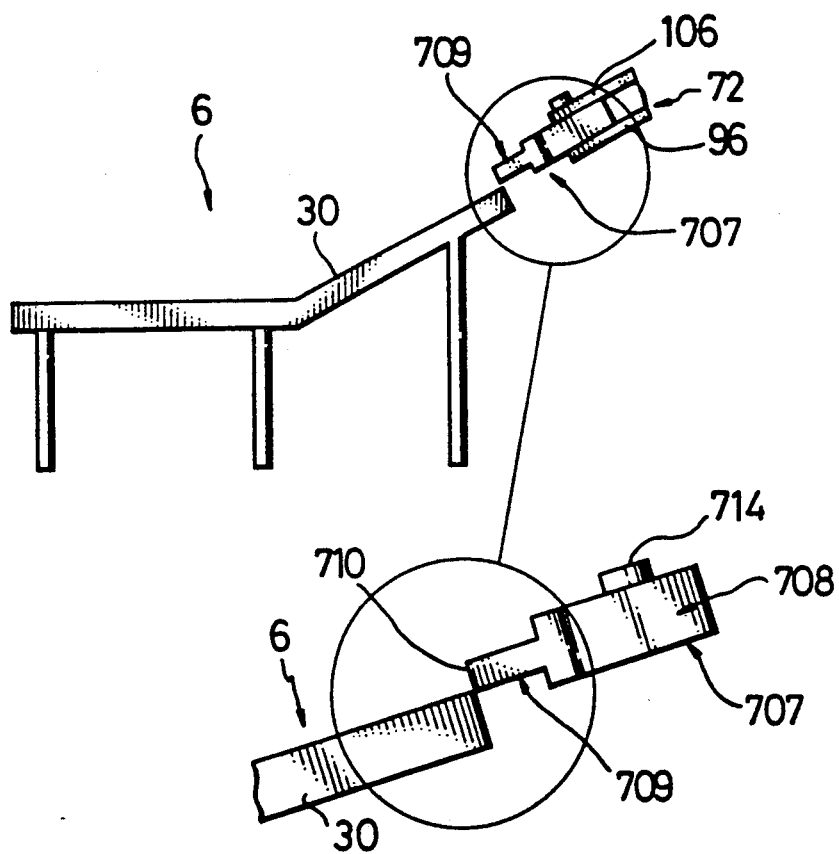

The flow charts of FIGS. 15a and 15b described above can be executed by the unit 7 by means of the command block 271 (FIG. 9) for the execution of the production cycle and the production of the profile illustrated in FIG. 7.

The advantages obtained with the system of the present invention for increasing the speed of operation of a robot manipulation device of a sheet metal bending installation are evident from what has been described; in fact, after an operator has defined an operating cycle the electronic unit 7 automatically associates the instructions which command movements between successive points therefore avoiding unnecessary stops at intermediate points in the trajectory; moreover, there is an operative association of various phases of the cycle which can be effected contemporaneously, and, for security, there are also inserted delay signals for synchronisation and control of the command instructions connected to the phases which are commanded simultaneously, to guarantee that a following phase is only performed after the preceding phase has been completed.

Referring to FIGS. 16a, 16b-22 as well as FIGS. 1-11, a second embodiment of the present invention will now be described.

The arrangement of the second embodiment differs from that of the first embodiment in the arrangement shown in FIGS. 16a, 16b-22.

In the system constituting the second embodiment of the present invention, a sequence of command signals of the type described above, and defined for a given bending installation, is modified automatically by the electronic unit 7 on the basis of the dimension of the bending installation on which it effectively operates.

More precisely, a sequence of command signals, for example those utilised to form the profile illustrated in FIG. 7, is created by controlling a bending installation having a given configuration utilised as a reference for all the other bending installations; this specimen bending installation will be indicated hereinafter with the term "master" and all the other similar bending installations assembled subsequently will be indicated with the term "slave".

The second embodiment of the present invention operates to perform a series of tests on the "master" installation and on the "slave" installation, to detect by how much certain dimensions of the configurations comprising parts of the "slave" installation differ from the corresponding dimensions of the "master" installation, and to modify the sequence of command signals utilised on the "slave" installation (but defined for the "master" installation) in such a way that this sequence of command signals controls the "slave" bending installation in an absolutely correct and precise manner To detect the difference between the "master" installation and the "slave" installation dimensional checks are made on these, and a first and a second metal specimen block are utilised, illustrated in FIGS. 16a and 16b, and indicated with the numerals 702 and 707, which are respectively gripped by the auxiliary pincers 12 and by the pincers 72 and 73 of the heads 10, and serve as abutment elements for the detection of various dimensions of these installations, as will be described hereinbelow.

The first specimen block 702 includes a first flat portion 703 shaped as a rectangular parallelepiped from one end of which extend two portions 704 of greater thickness, which terminate with flat front surfaces 705. These appendices 704, moreover, are inclined with respect to the portion 703 by an angle gamma ($\gamma$) equal to about 130° so as to be divergent from one another.

The second specimen block 707 comprises a flat parallelepiped main portion 708 from the front of which extends a coplanar projection 709 of reduced thickness which terminates with a flat front surface 710.

The portion 708 has a second portion 711, which extends laterally of the portion 708 in a direction perpendicular to the first projection 711, and terminates with a flat front face 712 which functions as an abutment element in a manner which will be clarified hereinbelow, moreover this portion 711 has an end part 714 of greater thickness at the top, the surface of which will also be utilised as will be seen in detail.

There will now be described, with reference to FIGS. from 17 to 19, the three predetermined configurations used in the system of the present invention, in which the dimensions of the bending installations 500 are detected by positioning the specimen blocks 702 and/or 707, and in particular the position of the loading device 5 is detected, as is that of the discharge table 6 and the auxiliary support unit 124 with respect to the manipulator device 4.

To obtain the first of these predetermined detection configurations (FIG. 17) the blocks 702 and 707 are firmly gripped, respectively, by an auxiliary pincer 12 of the auxiliary support group 124, and by a pincer 72 of the manipulator heads 10; in particular, the jaws 154 of the pincer 12 close on the free end faces of the flat portion 703 of the block 702, and the jaws 96 and 106 of the pincer 72 close on the faces of the main portion 708 of the block 707.

The auxiliary support group 124 and the manipulator device 4 are then moved, conveniently by means of the keyboard 11 and the associated movement keys as described hereinabove, in such a way that the box-like arm 126 is tilted down towards the press 1, and consequently the beam 14, which carries the auxiliary pincers 12 is likewise lowered so that the axis of the upper portion 704 of the block 702 is located horizontally; the manipulator head 10 which carries the block 707 is in turn displaced until it approaches the block 702, and the flat front face 712 of the block 707 comes into contact with the side wall of the portion 704 with the upper front edge of the end wall 714 fitting together with the upper side edge of the portion 704.

The dimensions (X, Y, Z, A, B, C, D) relating to this first configuration and which identify the position of the auxiliary support group 124 with respect to the manipulator device 4 are then memorised in a manner which will be clarified hereinbelow.

In the second predetermined detection configuration (FIGS. 18a and 18b) the position of the loader device 5 is modified with respect to the manipulator device 4, with reference to the positioning of the sheet 23 for gripping with the manipulator heads 10.

To effect this detection an operator imparts to the loader device 5 the instruction to load a sheet 23 so that the suckers 28 grip this sheet 23 which is then raised by the beam 24, and positioned between the loader device 5 and the discharge table 6 in the gripping zone of the heads 10. At this point the operator, for example still by means of the keys on the keyboard 11, causes the beam 46 to move along the X axis towards the magazine 5, and causes the head 10 carrying the block 707 to move, as has already been described in the first detection configuration, until the upper front edge of the end wall 714 of the block 707 comes into contact with the lateral edge of the sheet 23 (which is rectangular) parallel to the Y axis (FIG. 18a) with the central axis of the upper wall of this part 714, coincident with the central axis of the sheet 23 (along the X axis).

This second detection configuration can also be effected with a pair of blocks 707 carried by the pair of heads 10 against the parallel lateral edges of the sheet 23 (FIG. 18b). The dimensions X, Y, Z, A, B of this second configuration and which identify the position of the sheet 23, and consequently of the supporting loading device 5, with respect to the manipulator device 4, are also memorised as will be described below.

In the third of the predetermined detection configurations (FIG. 19a) the position of the discharge table 6 with respect to the manipulator device 4 is checked.

To effect this detection an operator, again conveniently utilising the keyboard 11, moves the beam 46 until the heads 10 are located in front of the discharge table 6. Subsequently the heads 10 which carry a respective block 707 as already illustrated for the preceding detection configurations, are raised and caused to rotate in such a way that the block 707 is located in front of the support bed 30 with the projection 709 facing towards this bed 30 and positioned on parallel inclined planes.

Finally, as is visible in the detail of FIG. 19b, the heads 10 are caused to translate slowly until the lower edge of the front wall 710 of the projection 709 comes into contact with the front edge of the table 30. Again the dimensions (X, Y, Z, A, B) of this third detection configuration, which identify the position of the support bed 30 of the table 6 with respect to the manipulator device 4 are memorised.

Figure 20:
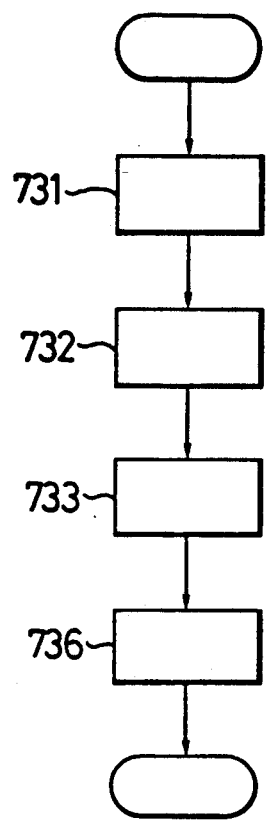
FIGS. 20 and 21 are flow charts of various stages of the dimensional checking and automatic adaptation system of the present invention.

In FIG. 20 there is illustrated in detail a flow chart of a first operating stage of the system according to the present invention, conveniently effected with a command and control unit 7 of the specimen installation, in which the dimensions (X, Y, Z, A, B, C, D) relating to the predetermined detection configurations and described hereinabove with reference to FIGS. from 14 to 16 are memorised for this "master" specimen bending installation 500.

In particular it has a block 731 which, after the first predetermined detection configuration has been reached (FIG. 17) by means of a key of the keyboard 11 selected by an operator, commands a memory block of the unit 7 to acquire a first set of dimensions which defines the position of the auxiliary support unit 124 with respect to the manipulator device 4 in the master installation.

Conveniently this block 731 can preliminarily present on the video 9 a schematic illustration such as that shown in FIG. 17, which serves as a guide for the operator for the configuration which must be achieved. After memorisation of this first set of dimensions has taken place, from the block 731 it passes to a block 732 analogous to block 731 it passes to a block 732 analogous to block 731 which, after the second predetermined detection configuration has been reached (FIG. 18a) conveniently preliminarily shown on the video 9, commands the acquisition of the second set of dimensions which define the position of the loader device 5 with respect to the manipulator device 4 of the master installation.

From the block 732 it then passes to a block 733 analogous to the two preceding blocks and which, after the third predetermined detection configuration (FIG. 19a) has been reached, commands the acquisition of the third set of dimensions which define the position of the discharge table 6 with respect to the manipulator device 4 of the "master" installation.

The block 733 is followed by a block 736 which provides for regrouping of the said first, second and third sets of dimensions in a form which can be extracted from the electronic unit 7.

Figure 21:
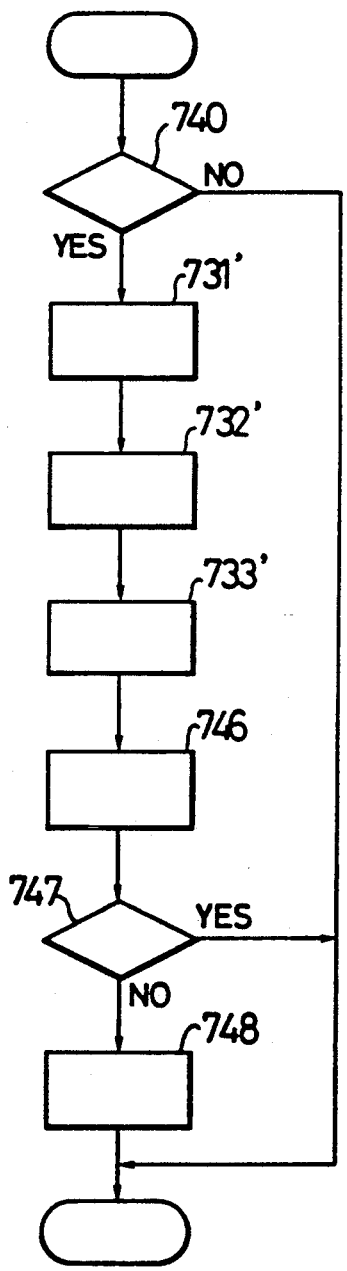

In FIG. 21 there is illustrated in detail a flow chart of a second operating stage of the system of the present invention, conveniently put into effect with the command and control unit 7 of the slave installation to be tested, in which the dimensions (X, Y, Z, A, B, C, D) relating to the three predetermined detection configurations described hereinabove with reference to FIGS. from 17 to 19 are , detected in this "slave" installation and memorised. These dimensions are then compared with the previously detected corresponding dimensions of the "master" installation, and there is then performed, in an automatic manner, an adaptation of the sequence memorised in a sample installation of the command and control signals defining a bending cycle for the said installation.

In particular, it has a first block 740 which tests if the three sets of "master" installation dimensions for the three configurations defined hereinabove have been already memorised in the electronic unit 7 of the assembled "slave" installation 500. In the negative case it exits from this stage, whilst in the positive case it passes from block 740 to a block 731', analogous to the block 731 of FIG. 20, which, after the first predetermined detection configuration has been reached by the "slave" installation (FIG. 17) commands, by means of a key of the keyboard 11 selected by an operator, effects the acquisition in a memory block of the unit 7 of the "slave" installation 500, of a first set of dimensions which define the position of the auxiliary support unit with respect to the manipulator device 4. Conveniently this block 731' can also preliminarily present to the operator, on the video 9, a schematic illustration of the detection configuration which must be reached. After memorisation of this first set of dimensions of the slave installation has taken place it passes from the block 731' to a block 732', analogous to the block 732 of FIG. 20, which after the second predetermined detection configuration has been reached by the slave installation (FIG. 18a) commands the acquisition of the second set of dimensions which define the position of the loader device 5 with respect to the manipulator device 4 of the slave installation.

From block 732' it passes to a block 733', analogous to the block 733 of FIG. 20, which, after the third predetermined detection configuration of the "slave" installation has been reached (FIG. 19a) commands the acquisition of the third set of dimensions which define the position of the discharge table 6 with respect to the manipulator device 4.

The block 733' is followed by a block 746 which provides for monitoring the compatibility of the dimensions of the "master" installation with those of the "slave" installation indicative of the correct assembly of the "slave" installation. This block 746 tests by how much the dimensions of the "master" in each of the three detected configurations differ from the corresponding dimensions of the "slave" installation, and if this difference exceeds predetermined limit values previously defined and memorised in the electronic unit 7 the block 746 provides a display on the video 9 of the dimensions exceeding the normal, and activates an acoustic alarm signal so that the operator can arrange for rectification of the assembly of the bending installation 500.

If on the other hand all the dimensions of the "slave" system in the three configurations differ from the corresponding dimensions of the "master" installation by an amount less than the limit value, it passes from block 746 to a block 747 without any alarm indication.

If the differences between the corresponding dimensions exceed the limit values the block 747 determines the end of the dimensional testing stage according to the present invention, whilst on the other hand if all these differences are less than the limit values it passes to a block 748 which acts to effect automatic correction of a memorised sequence defined on a specimen system for the command and control signals defining a bending cycle to be performed on the "slave" installation 500.

Figure 22:
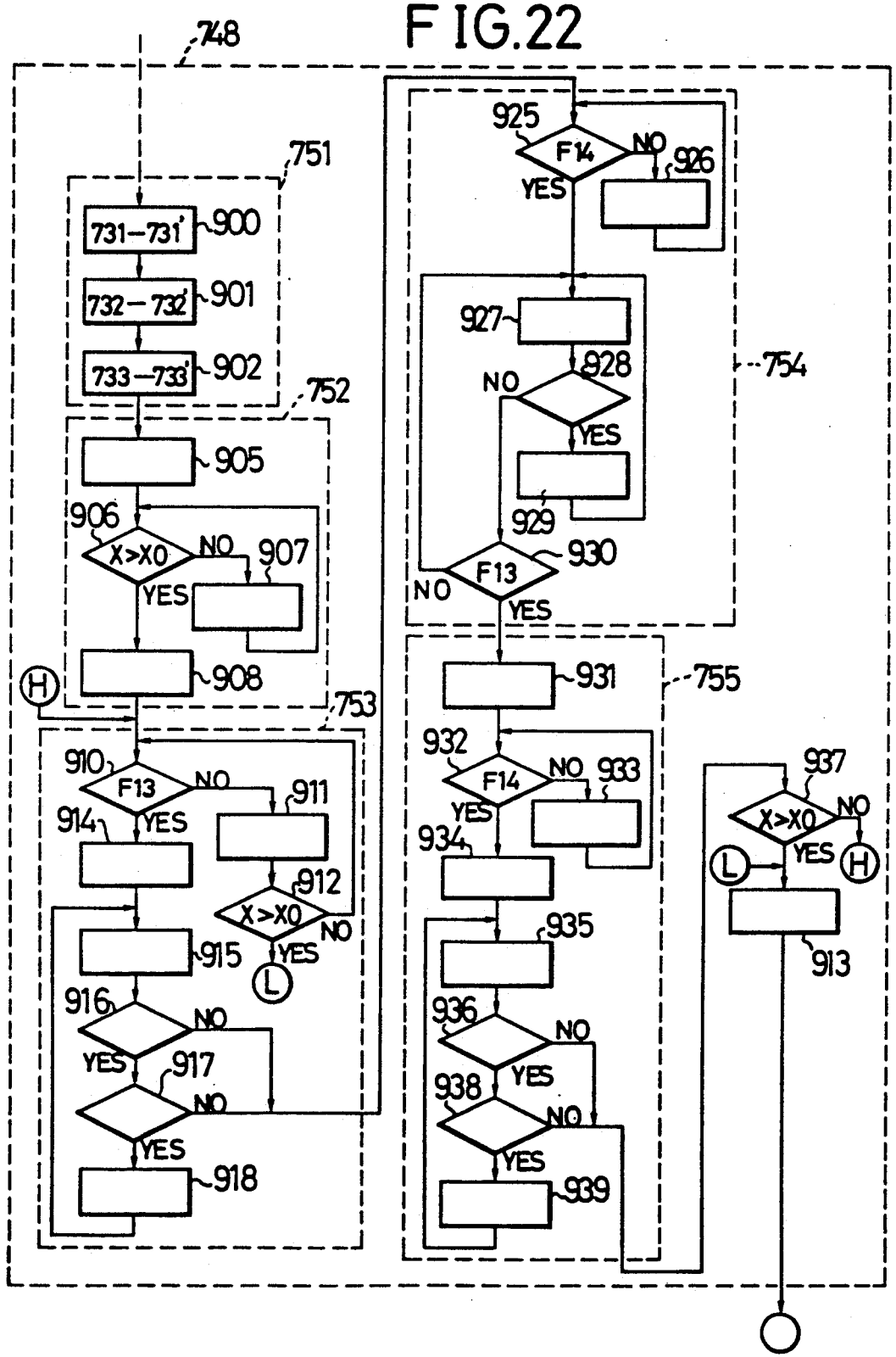
FIG. 22 is a more detailed flow chart of a component block of the flow chart illustrated in FIG. 21.

The block 748 of FIG. 21 is illustrated in detail in FIG. 22. It starts with a block 751 which recalls from the memory of the electronic unit 7 the corresponding dimensions for the three predetermined detection configurations of the "master" and "slave" installations, compares them and finally calculates the associated differences; in particular a first block 900 calculates the differences X1, Y1, Z1, A1, B1, C1, D1 between the dimensions X, Y, Z, A, B, C memorised by the blocks 731 and 731' in the first detection configuration, a second block 901 calculates the differences X2, Y2, Z2, A2, B2, C2, D2 between the dimensions X, Y, A, B, C, D memorised by the blocks 732 and 732' in the second detection configuration, and a third block 902 calculates the differences X3, Y3, Z3, A3, B3, C3, D3 between the dimensions X, Y, Z, A, B, C, D memorised by the blocks 733 and 733' in the third detection configuration.

From the block 751 it passes to a block 752 which re-examines the created sequence of command signals (for example of the type described with reference to FIGS. 10a and 10b) and searches within this sequence of instructions for command signals produced with the MOVE key and thus 0 expressed in the form MOVE ($\pm X$, $\pm Y$, $\pm Z$, $\pm A$, $\pm B$, $\pm C$, $\pm D$), and relating to the displacement of the manipulator device 4 in proximity to the loading device 5; the block 752 thus modifies all the signals expressed with the MOVE key in which the variable X is greater than a predetermined numerical reference value $X_O$ (for example $X \geq 3500$), which indicates that the manipulator device 4 is located close to the loading device 5, and this block 722 modifies the values of these movement command instructions on the basis of the differences X2, Y2, Z2, A2, B2, C2 determined by the block 901 and representative of the differences between the dimensions of the "master" and "slave" installations for the movement instructions relating to this loading stage.

In particular, within block 752 there is a first block 905 which commands the analysis of the first instruction of the flow chart illustrated in FIGS. 10a and 10b and formed as described, then moves on to a block 906 which detects if this instruction relates to the command for positioning the heads 10 against the sheet 23, carried by the loading device 5, which is detectable by means of the value of the dimension X of the "MOVE" instruction, i.e. by testing if this value X is greater than a value $X_O$. In the negative case this indicates that the instruction under examination still relates to an earlier displacement stage than the positioning of the heads 10 against the sheet 23, so that it moves onto a block 907 which commands analysis of a subsequent instruction of this flow chart of FIGS. 10a and 10b, and then returns to the block 906, whilst in the positive case it moves on to a block 908 which imposes the modification, in the sequence of movement command instructions for which X remains greater than $X_O$, by an amount corresponding to the values X2, Y2, Z2, A2, B2, C2, D2 determined by the block 901, and then moves on to a block 753 for the continuation of the analysis of the instructions of the cycle.

The block 753 searches in the previously memorised sequence of command signals those command signals indicative of a commencement of utilisation of the auxiliary support group 124 and obtained for example by means of the function key F13. Once this command signal is found the Y and Z values, of the "MOVE" type command signal which immediately precedes the command signal formed utilising the function key F13 are memorised. On the basis of these Y and Z values the dimensions of all the consecutive "MOVE" type command signals which precede this command signal defined by the function key F13, and which are close to this position differing from these Y and Z values by a predetermined value $Y_O$ and $Z_O$ (for example 100 mm) are changed, and these dimensions of the command signals X, Y, Z, A, B, C, D are modified on the basis of the differences X1, Y1, Z1, A1, B1, C1, D1 determined by the bock 900 and representative of the differences between the dimensions of the "master" and "slave" installations for the movement instructions referred to this working stage between the manipulator device 4 and the beam 14 with the auxiliary pincers 12. In particular, within block 733 there is a block 910 which tests if the instruction of the flow chart of FIGS. 10a and 10b under examination relate to the command for initiation of the use of the auxiliary support group 124 (determined by the function key F13); in the negative case it moves on to block 911 which commands analysis of a subsequent instruction of this flow chart of FIG. 10a and 10b, and then moves on to a block 912 which, in an analogous manner to block 906, detects if this instruction relates to the command for positioning the heads 10 with the sheet 23 at the discharge table 6, this being detectable by means of the value of the dimension X of the "MOVE" instruction, and testing if this value X is greater than a value $X_O$; in the negative case this indicates that the instruction under examination still relates to an earlier stage or displacement than this final positioning of the heads 10 with the sheet 23 at the discharge table 6 so that it returns to the block 910, whilst in the positive case it moves on to a block 913 the operation of which will be described in detail hereinbelow. IF the positive condition is detected by the block 910, indicative of the command for utilisation of the auxiliary support group 124, it moves on to a block 914 which commands memorisation of the Y and Z values of the "MOVE" type command signal which immediately precede the command signal relating to the block 910. From block 914 it moves to a block 915 which commands analysis of a previous instruction defined in this flow chart of FIGS. 10a and 10b, and then to a block 916 which detects if this previous instruction is of the "MOVE" type and in the negative case it exits from block 753 and moves on to a subsequent block 754. In the case of a positive condition detected by the block 916 it moves on to a block 917 which detects if this movement instruction under examination has Y and Z values which differ from the Y and Z values memorised by the block 914 by an amount less than a respective predetermined maximum limit $Y_O$ and $Z_O$ in the negative case (movement beyond this predetermined field) it exits from block 753 and moves to a subsequent block 754, whilst in the positive case it moves on to a block 918 which imposes on the instructions under examination, for each dimension of the command signal (X; Y; Z; A; B) a modification by a corresponding value X1; Y1; Z1; A1; B1; C1; D1 determined by the block 900, and then returns to the block 915 for continuation of the possible modification of all the preceding succession of movement instructions.

The block 754 then searches in the sequence of previously memorised command signals for command signals indicative of the termination of the utilisation of the auxiliary support group 124, and obtained for example by means of the function key F14. Once this command signal is found the dimensions of all the "MOVE" type command signals which lie between the beginning and the end of this use of the auxiliary support group 124 are changed, and these values of the command signals (X, Y, Z, A, B, C, D) are modified on the basis of the corresponding differences X1, Y1, Z1, A1, B1, C1, D1 determined by the block 900 and representative of the differences between the "master" and "slave" installations for the working stages as already described. In particular, block 554 has a block 925 which tests if the instruction of the flow chart of FIGS. 10a and 10b under examination relates to the command for the end of the use of the auxiliary support group 124 (determined by the function key F14); in the negative case it moves on to a block 926 which commands the analysis of a subsequent instruction in this flow chart of FIGS. 10a and 10b, and then returns to the block 925. In the case of a positive condition detected by the block 925, and therefore indicative of the command terminating the use of the auxiliary support group 124, it moves on to a block 927 which commands the analysis of a preceding instruction defined in this flow chart of FIGS. 10a and 10b, and then to a block 928 which detects if this preceding instruction is of the "MOVE" type. In the case of a positive condition detected by the block 928 it moves on to a block 929 which imposes the modification, in these instructions under examination, for each value of the command signal X; Y; Z; A; B by the corresponding value X1; Y1; Z1; A1; B1; C1; D1; determined by the block 900, and then returns to the block 927 to continue the modification of the preceding movement instructions. In the case of a negative condition detected by the block 928, so that the preceding instruction is not of the "MOVE" type, it moves on to a block 930 which detects if the instruction of the flow chart of FIGS. 10a and 10b under examination relate to the command to commence utilisation of the auxiliary support unit 124 (determined by the function key F13); in the negative case it returns to the block 927 which commands the analysis of a preceding instruction in the flow chart of, FIGS. 10a and 10b, whilst in the case of a positive condition detected by the block 930, and thus indicative that the modification has been made for all the movement instructions lying in the field of use of the auxiliary support group 124, it exits from block 754 and moves on to a block 755 which, splitting off from the command signal indicative of the end of utilisation of the auxiliary support group 124, defined for example by the function key F14, commands the memorisation of the Y and Z values of the "MOVE" type command signal which immediately follows this command signal formed utilising the function key F14. On the basis of these Y and Z values the values of all the consecutive "MOVE" type command signals which follow this command signal defined by the function key F14, and which are close to this position differing from these Y and Z values by a predetermined value $Y_O$ and $Z_O$ (for example 100 mm) are changed, and these command signal values (X, Y, Z, A, B, C; D) are modified on the basis of the differences X1, Y1, Z1, A1, B1, C1, D1 determined by the block 900 and representative of the differences between the dimensions of the "master" and "slave" installations for this stage corresponding to the working of the manipulator device 4 with the auxiliary pincers 12. In particular, block 755 has a block 931 which commands the analysis of a subsequent instruction of the flow chart of FIGS. 10a and 10b, and then moves on to a block 932, which, in a manner analogous to the block 925, tests if the instruction under examination of the flow chart of FIGS. 10a and 10b relate to the command for the end of utilisation of the auxiliary support group 124 (determined by the function key F14); in the negative case it moves on to a block 933, analogous to block 926, which commands analysis of a subsequent instruction of the flow chart of FIGS. 10a and 10b, and then returns to the block 932. In the case of a positive condition detected by the block 932, that is to say indicative of the command for the end of the use of the auxiliary support group 124, it moves on to a block 934 which commands the memorisation of the Y and Z values of the "MOVE" type command signal which immediately follows the command signal detected by the block 932. From block 934 it moves to a block 935 which commands the analysis of a following instruction defined in the flow chart of FIGS. 10a and 10b, and then to a block 936 which detects if this following instruction is of the "MOVE" type, and in the negative case it exits from block 755 and moves to a subsequent block 937. In the case of a positive condition detected by the block 936 it moves on to a block 938 which detects if this movement instruction under examination has Y and Z values which differ from the Y and Z values memorised by the block 934 by an amount less than a respective predetermined maximum limit value $Y_O$ and $Z_O$ in the negative case (movement beyond this predetermined range) it exits from block 755 and moves on to block 937, whilst in the positive case it moves to a block 939 which imposes on the instruction under examination, for each value of the command signal (X, Y, Z, A, B ...) a modification by a corresponding value (X1, Y1, Z1, A1, B1, C1, D1) determined by the block 900, and then returns to the block 935 to continued with possible modifications on all the following movement instructions in succession.

The block 937 then detects if the instruction under examination relates to the command for positioning the heads 10 with the sheet 23 over the discharge table 6, this being detectable by means of the value of the dimension X in the "MOVE" instruction, and testing if this value X is greater than a value $X_O$; in the negative case this signifies that the instruction under examination still relates to a stage of a displacement earlier than this final displacement of the heads 10 with the sheet 23 over the discharge table 6 so that it returns to the block 753 for the continuation of the correction of the movement instructions relating to other possible working stages between the manipulator device 4 and the auxiliary pincers 12; whilst in the positive case it moves to the block 913 which imposes the modification, in the sequence of movement command instructions for which X remains greater than $X_O$, by corresponding amounts equal to the values X3, Y3, Z3, A3, B3 ... determined by the block 902, and then exits from the block 748 and from the stage of automatic correction of the instructions for the working cycle according to the present invention.

The flow chart illustrated in FIGS. 10a and 10b and with the movement command instructions automatically modified as described above according to the embodiment of the present invention, is then executed by the unit 7 of the installation 500 by means of the command block 271 (FIG. 9) for the execution of the production cycle and the formation of the profile illustrated in FIG. 7.

The advantages obtained with the system of the present invention for dimensional testing of the configuration of the sheet metal bending installation 500 and the automatic adaptation of the command signals for controlling the movement of this installation are evident from what has been described; in fact, after a sheet metal bending installation similar to a specimen installation has been assembled, the system of the present invention is able, by detecting of the coordinates of the position of the manipulator device in three predetermined configurations, and by comparing them with the corresponding coordinates of analogous configurations on the specimen system, to test if the configuration of the assembled installation is correct, and of warning, the operator, and moreover, in the case of correction of this assembled configuration, the system of the present invention is able automatically to adapt the sequence of movement command and control signals dimensionally for this manipulator device, which signals were defined on the specimen installation, taking into account the small dimensional differences which inevitably exist between the two installations. In this way, therefore, it is not necessary to have to define a new sequence of command and control signals (for an already defined bending cycle) for each new installation fitted, and the sequence already memorised and defined on the specimen installation can be utilised, with evident advantages of reduction in preparation times for this already defined bending cycles for new installations.

The detection of the dimensions of the position of the manipulator device in the new installation and the comparison with the dimensions of the analogous configurations on the specimen installation are effected in three predetermined configurations which are those relating to the working stages of the heads of the manipulator device respectively with the auxiliary support pincers, with the loading magazine and with the discharge table, and only those sequences of command and control signals for movements of this manipulator device which are close to these working stages are automatically dimensionally adapted so that only in correspondence with these precise stages of movement is it necessary to obtain exact correspondence between the values of the movement instructions as defined on the specimen installation and the values effective on the actual installation.

Finally, it is clear that the system forming the subject of the present invention can have variations and modifications introduced thereto without departing from the protective ambit thereof.

For example the function keys 260 of the keyboard 11 (hand box) can be selected in pairs, or together with keys having a different significance.

The flow chart illustrated in FIG. 10 can be achieved with an external programming unit 480 independently from the electronic unit 7, this external unit also being provided with function keys similar to the keys 260, which define the various previously described working phases, which are then memorised in the unit 7 by direct connection (by cable) or indirect connection (with magnetic supports etc) for execution as a production cycle. In this case the unit 7 in the flow chart of FIG. 9 from the block 270 directly commands the execution of the cycle with the block 271.

The associated sequences of command and control signals described and effected by the blocks 502 and 503 can be made only partially, or combined differently; moreover, with reference to FIG. 10a, the positioning command of the sensors 66 for reference in positioning the sheet 23 between the dies 2 and 3 (conveniently defined by the function key F21) can also be associated with command instructions for movement of the heads 10 (with the sheet 23 gripped thereon) towards the press 1, so as to be achieved simultaneously.

The commands for association of phases of the operation can be determined by detection of positions achieved by the movable elements of the system, or for example by the selections effected on the function keys in the creation of the basic sequences of command and control signals.

The flow chart illustrated in FIGS. 10a and 10b can also be achieved with an external programming unit 480 independent from the electronic unit 7, and then speeded up with the system of the present invention still in this outer unit 480, and then memorised in the unit 7 to be performed as a production cycle.

The effective speeding up system of the present invention, can be utilised for sheet metal bending installations having a form and operation different from that described, and also not provided with function keys as previously illustrated.

The dimensional testing and automatic adaptation system of the present invention can, finally, be utilised for sheet metal bending installations having a different form and operation from that described.

Finally, the system described can be utilised for sheet metal bending installations having a different function and form from that described.

We claim:

1. A device for controlling a robot manipulator of a metal sheet bending installation, comprising:
   a first set of keys for inputting a command signal for designating a movement corresponding to a certain one of a plurality of actuator means, each of said plurality of actuator means being adapted to perform one or more specifically defined movements of one or more first movable members of the metal sheet bending installation;
   a second key for inputting a command signal causing one of a plurality of second movable elements to be moved in a changeable direction; and
   a plurality of keys corresponding to a plurality of possible changeable directions of said second movable member, for inputting signals which define the changeable direction in which the second movable elements will be moved by actuation of said second key and by subsequent actuation of said plurality of keys.

2. The control device according to claim 1, wherein said second key comprises a MOVE key for entering an initial signal, said initial signal indicating that a subsequent signal will comprise information concerning a changeable direction in which one or more of said second elements are to be moved.

3. A control device of claim 2, wherein the second key means including a MOVE key for inputting a signal showing that a data input after the signal is the changeable distance or amount through which the another movable element is to be moved, and a key for inputting the data for the changeable distance or amount through which the another movable element is to be moved.

4. A device for control of a metal sheet bending installation, including a bending press and a robot manipulator for feeding a workpiece, comprising a metal sheet, into the bending press and removing the metal sheet from the bending press, the robot manipulator adapted to be located at a stand-by position away from the bending press while a bending operation is performed on a metal piece, the stand-by position being defined as the position of the robot manipulator while a bending operation is performed on a workpiece, the control device comprising:
   first means for inputting a first instruction for carrying out a bending operation on the workpiece by said bending press;
   second means for inputting a second instruction for moving said robot manipulator from the stand-by position to a position close to said bending press;
   said second means further comprising means for inputting, after said second instruction, a third instruction for moving said robot manipulator from the position close to the bending press, to a position where the robot manipulator can grip the workpiece clamped between a punch and die of the bending press, after a bending operation is completed; and
   an electronic unit, said electronic unit comprising means adapted to insert, between said second and said third instructions, a synchronization and control signal having a predetermined delay time, the electronic unit being adapted to associate with said first instruction signal, a further instruction between said first instruction and said synchronizing and control signal, said further instruction to be processed at the same time as said first instruction is processed, said further instruction moving said robot manipulator toward the workpiece clamped between the punch and die while a bending operation by the punch and die of the bending press is performed.

5. A method of controlling a robot manipulator of a metal sheet bending installation that includes a metal sheet bending press and an auxiliary support unit, the robot manipulator and the auxiliary support unit each including pincers, the method comprising the steps of:
   preparing and storing first command signals for moving the robot manipulator and the auxiliary support unit by predetermined amounts in a master bending specimen bending installation;
   causing the pincers of the robot manipulator and the pincers of the auxiliary support unit to each grip respective specimen blocks, provided in said master specimen bending installation;
   moving the pincers of the robot manipulator and the pincers of the auxiliary support unit until said specimen blocks gripped by the pincers in said master specimen bending installation come into contact with each other;
   calculating and storing a first positional relationship between robot manipulator and the auxiliary support unit in said master specimen bending installation based upon the distances moved by the pincers of the robot manipulator and the pincers of the auxiliary support unit;
   causing the pincers of the robot manipulator and the pincers of the auxiliary support unit to each grip respective specimen blocks in a slave specimen bending installation;
   moving the pincers of the robot manipulator and the pincers of the auxiliary support unit until the specimen blocks gripped by the pincers in said slave specimen bending installation come into contact with each other;
   calculating a second positional relationship between the robot manipulator and the auxiliary support unit in said slave specimen bending installation based on the distances moved by the pincers of the robot manipulator and the pincers of the auxiliary support unit;
   comparing the first and second positional relationships; and
   preparing second command signals for moving the robot manipulator and the auxiliary support unit in a slave specimen bending installation, the second command signal preparing step further including the step of modifying the first command signals in accordance with differences between the first and second positional relationships.

6. A sheet metal bending installation comprising:
   a metal sheet bending press;
   a robot manipulator, said robot manipulator comprising pincers adapted to grip a specimen block;
   an auxiliary support unit, said auxiliary unit comprising pincers adapted to grip a specimen block;
   said robot manipulator and said auxiliary support unit being arrangeable in at least first and second positional relationships;
   input means for inputting first command signals for moving said robot manipulator and said auxiliary support unit by predetermined amounts in the first positional relationship;
   means for storing said first command signals;
   calculation means for calculating data of positional relationships between said robot manipulator and said auxiliary support unit in associated with the distances moved by said pincers gripping said specimen blocks until said specimen blocks come into contact with each other;

means for storing the calculated data associated with said first and second positional relationships;

wherein said calculation means comprises means for modifying said first command signals in accordance with differences between said calculated data of said first and second positional relationships to prepare second command signals for moving said robot manipulator and said auxiliary support unit in said second positional relationship.

* * * * *

UNITED STATES PATENT AND TRADEMARK OFFICE
CERTIFICATE OF CORRECTION

PATENT NO. : 5,287,433
DATED : February 15, 1994
INVENTOR(S) : G. PRUNOTTO et al.

It is certified that error appears in the above-indentified patent and that said Letters Patent is hereby corrected as shown below:

On the cover, in section [75], "Inventors", line 2, change "Turin" to ---Torino---.
On the cover, in section [56], "References Cited", line 21, change "2217002" to ---2211002---.
At column 3, line 29 change "illustrated" to ---illustrate---.
At column 8, line 10 change "8a-8q" to ---8a-8j and 8l-8q---.
At column 8, line 11 change "8a-8q" to ---8a-8j and 8l-8q---.
At column 8, line 23 change "8a-8q" to ---8a-8j and 8l-8q---.
At column 10, line 36 change "a complete of the" to ---a Complete---.
At column 10, line 37 change "Cycles" to ---Cycle---.
At column 10, line 38 change "Installation"by" to ---Installation by---.
At column 10, line 39 change "Environment." to ---Environment".---.

Signed and Sealed this

Twenty-sixth Day of September, 1995

*Attest:*

BRUCE LEHMAN

*Attesting Officer*   Commissioner of Patents and Trademarks